United States Patent
Danovitz et al.

(10) Patent No.: US 10,275,395 B2
(45) Date of Patent: Apr. 30, 2019

(54) CLOUD-BASED MEDIA CONTENT MANAGEMENT

(71) Applicant: TiVo Solutions Inc., San Carlos, CA (US)

(72) Inventors: Joshua Danovitz, San Carlos, CA (US); Todd Kulick, Mountain View, CA (US); Paul Stevens, Felton, CA (US); Joe Sinnott, Palo Alto, CA (US); Scott Redman, Fremont, CA (US); Roland Besserer, Felton, CA (US)

(73) Assignee: Tivo Solutions Inc., San Jose, CA (US)

( * ) Notice: Subject to any disclaimer, the term of this patent is extended or adjusted under 35 U.S.C. 154(b) by 0 days.

(21) Appl. No.: 14/705,938

(22) Filed: May 6, 2015

(65) Prior Publication Data
US 2015/0324379 A1    Nov. 12, 2015

Related U.S. Application Data

(60) Provisional application No. 62/048,788, filed on Sep. 10, 2014, provisional application No. 61/989,466, filed on May 6, 2014.

(51) Int. Cl.
*G06F 16/11* (2019.01)
*G06F 16/43* (2019.01)
(Continued)

(52) U.S. Cl.
CPC .......... *G06F 16/125* (2019.01); *G06F 16/152* (2019.01); *G06F 16/43* (2019.01);
(Continued)

(58) Field of Classification Search
CPC ......... G06F 17/30109; G06F 17/30784; G06F 16/125
(Continued)

(56) References Cited

U.S. PATENT DOCUMENTS 7,162,690 B2 *  1/2007  Gupta ................... G06F 17/241
                                              707/E17.009
7,428,696 B2 *  9/2008  Shin ................. H04L 29/06027
                                              701/468
(Continued)

FOREIGN PATENT DOCUMENTS

EP   1768347    3/2007
EP   2651123   10/2013
(Continued)

OTHER PUBLICATIONS

"VMesh: Distributed Segment Storage for Peer-To-Peer Interactive Video Streaming", IEEE Journal on Selected Areas in Communications, IEEE Service Center, Piscataway, US, vol. 25, No. 9.
(Continued)

*Primary Examiner* — Jensen Hu
(74) *Attorney, Agent, or Firm* — Haley Guiliano LLP

(57) ABSTRACT

A cloud-based media content management system for managing access to media content items is disclosed. Managing access to media content items by a cloud-based media content management system may include, for example, managing uploads of media content items from a population of media devices, reducing duplication of media content data stored in cloud-based storage, and providing user-controlled access to media content items stored in cloud-based storage across any number of user devices. In this context, a cloud-based media content management system and cloud-based storage system generally refer to hosted computing and data storage services that may be accessed by media devices and other devices over a digital network such as the Internet.

50 Claims, 15 Drawing Sheets

(51) Int. Cl.

| | | |
|---|---|---|
| *G06F 16/14* | (2019.01) | |
| *G06F 16/783* | (2019.01) | |
| *G06F 16/951* | (2019.01) | |
| *H04N 21/2743* | (2011.01) | |
| *H04N 21/2747* | (2011.01) | |
| *H04N 21/4788* | (2011.01) | |
| *H04N 21/845* | (2011.01) | |
| *H04L 29/08* | (2006.01) | |
| *H04N 21/2387* | (2011.01) | |

(52) U.S. Cl.
CPC .......... *G06F 16/783* (2019.01); *G06F 16/951* (2019.01); *H04N 21/2743* (2013.01); *H04N 21/2747* (2013.01); *H04N 21/4788* (2013.01); *H04N 21/8456* (2013.01); *H04L 67/10* (2013.01); *H04L 67/1097* (2013.01); *H04N 21/2387* (2013.01)

(58) Field of Classification Search
USPC ........................................................ 707/825
See application file for complete search history.

(56) References Cited

U.S. PATENT DOCUMENTS

| | | | |
|---|---|---|---|
| 8,464,309 B2* | 6/2013 | Barton | H04N 5/765 |
| | | | 386/291 |
| 8,650,159 B1* | 2/2014 | Zhang | G06F 17/30156 |
| | | | 707/664 |
| 9,112,948 B1 | 8/2015 | Wood | |
| 10,019,517 B2 | 7/2018 | Danovitz | |
| 2002/0055972 A1 | 5/2002 | Weinman | |
| 2002/0062381 A1 | 5/2002 | Gargiulo | |
| 2002/0085582 A1 | 7/2002 | Kim | |
| 2005/0080497 A1 | 4/2005 | Rfao | |
| 2005/0193408 A1* | 9/2005 | Sull | G06F 17/30817 |
| | | | 725/32 |
| 2006/0080167 A1* | 4/2006 | Chen | G06Q 30/02 |
| | | | 705/14.68 |
| 2007/0256112 A1* | 11/2007 | Weaver | H04N 5/782 |
| | | | 725/134 |
| 2008/0005204 A1 | 1/2008 | Prus | |
| 2009/0070356 A1 | 3/2009 | Mimatsu | |
| 2009/0083390 A1 | 3/2009 | Abu-Ghazaleh | |
| 2009/0210913 A1* | 8/2009 | MacDonald | H04N 5/782 |
| | | | 725/85 |
| 2009/0228938 A1 | 9/2009 | White | |
| 2009/0282159 A1* | 11/2009 | Wang | H04L 61/609 |
| | | | 709/231 |
| 2010/0332456 A1 | 12/2010 | Rahlad | |
| 2011/0082914 A1 | 4/2011 | Robert | |
| 2012/0210382 A1 | 8/2012 | Walker | |
| 2012/0284765 A1 | 11/2012 | Killick | |
| 2013/0080565 A1* | 3/2013 | van Coppenolle | G06Q 30/06 |
| | | | 709/213 |
| 2013/0132523 A1 | 5/2013 | Love et al. | |
| 2013/0132579 A1* | 5/2013 | Keum | H04W 8/22 |
| | | | 709/225 |
| 2013/0166697 A1* | 6/2013 | Manning | H04L 69/18 |
| | | | 709/219 |
| 2014/0037270 A1 | 2/2014 | Craner | |
| 2014/0082124 A1 | 3/2014 | Coppenolle | |
| 2015/0089554 A1 | 3/2015 | Phillips et al. | |
| 2015/0256862 A1* | 9/2015 | Fragale | H04N 21/2541 |
| | | | 725/54 |
| 2015/0324379 A1 | 11/2015 | Danovitz | |
| 2016/0371286 A1 | 12/2016 | Danovitz | |
| 2016/0371290 A1 | 12/2016 | Danovitz | |

FOREIGN PATENT DOCUMENTS

| | | |
|---|---|---|
| JP | 2009122708 | 4/2009 |
| JP | 2009181648 | 8/2009 |
| JP | 2009206724 | 9/2009 |
| JP | 2011010225 | 1/2011 |
| JP | 2013207421 | 10/2013 |
| JP | 2013214800 | 10/2013 |
| WO | WO2013081637 | 6/2013 |

OTHER PUBLICATIONS

World Intellectual Property Organization, Application No. PCT/US2015/29565, International Search Report dated Jul. 17, 2015.
World Intellectual Property Organization, Application No. PCT/US2015/29565, Pending Claims as of Jul. 17, 2015.

* cited by examiner

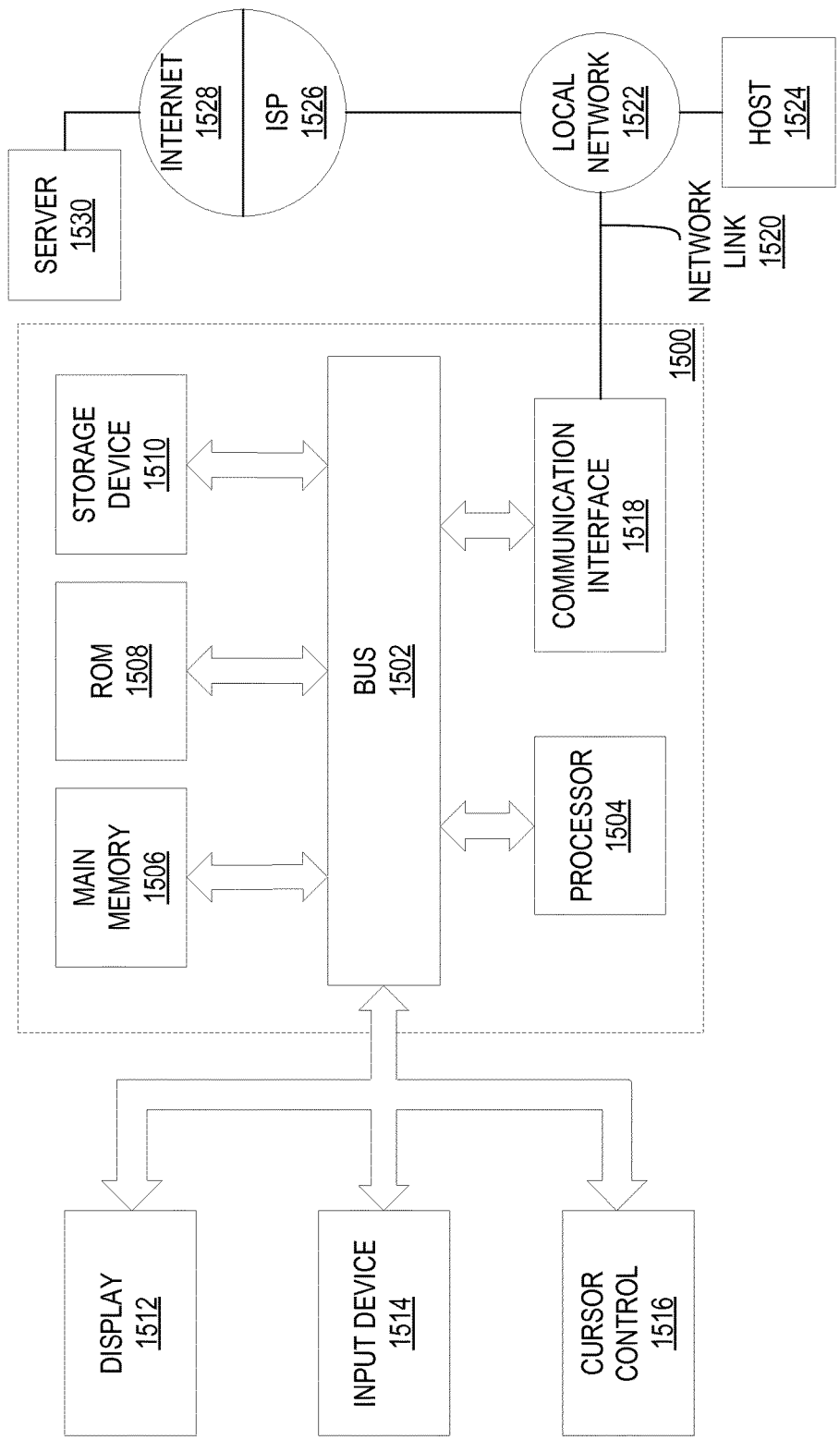

CLOUD-BASED MEDIA CONTENT MANAGEMENT

PRIORITY CLAIM

This application claims benefit of Provisional Appln. 61/989,466, filed May 6, 2014, and Provisional Appln. 62/048,788, filed Sep. 10, 2014, the entire contents of each is hereby incorporated by reference as if fully set forth herein, under 35 U.S.C. § 119(e).

TECHNICAL FIELD

Embodiments relate generally to the management of media content in a cloud-based computing environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital Video Recorders (DVRs) and other media devices enable users to record and view media content, among many other features. Typically, a DVR includes a hard disk drive or other integrated storage device on which media content items may be recorded. For example, if a user desires to record a television program for later or repeated viewings, the user may provide input to the DVR instructing the DVR to record a copy of the television program. The user may then instruct the DVR to play the recorded copy of the television program from local storage at a later time.

Cloud-based data storage services are an increasingly popular tool for users to store many types of data (e.g., documents, media content, etc.) and to access the data from any number of separate client devices. A cloud-based data storage provider typically hosts the physical servers and other components for storing user data and provide users access to the data over a digital network, such as the Internet. A cloud-based storage service may alleviate users from some of the burdens of managing local storage devices, including storage space limitations, potential hardware failures, and enabling access to user data across different client devices.

BRIEF DESCRIPTION OF THE DRAWINGS

In the drawings:

FIG. 15 is block diagram of a computer system upon which embodiments of the invention may be implemented.

DETAILED DESCRIPTION

Figure 1:
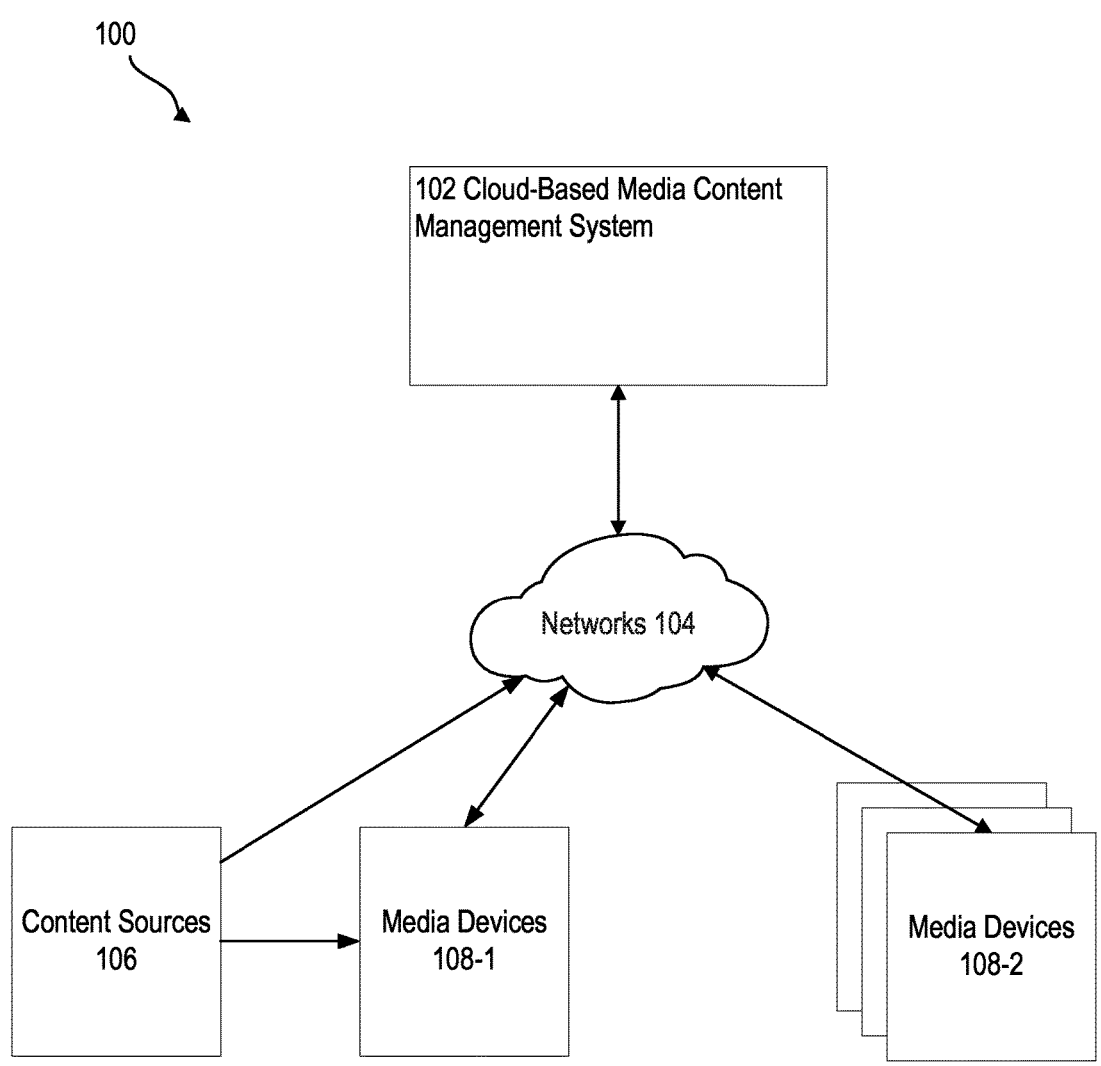
FIG. 1 is a block diagram of an example system that includes a cloud-based media content management system, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
   2.1. System Overview
   2.2. Example Cloud-Based Media Content Management System
   2.3. Example Service Provider System
   2.4. Example Media Device
3.0. Functional Overview
   3.1. Distributed Media Device Upload
   3.2. Cloud Storage of Media Content
   3.3. Media Content Playback
   3.4. Cloud-Based Tuners
   3.5. Cloud Storage Extender
4.0. Example Embodiments
5.0. Implementation Mechanism—Hardware Overview
6.0. Extensions and Alternatives

1.0. General Overview

Approaches, techniques, and mechanisms are disclosed for managing storage and access to media content items in a cloud-based computing environment. In this context, a cloud-based computing environment generally refers to a collection of computing and data storage services accessible to media devices and other client devices over a digital network such as the Internet. According to various embodiments, a cloud-based media content management system manages storage and access to media content items by managing uploads of media content items from a distributed population of media devices, reducing duplication of media content data stored in cloud storage, providing user account-controlled access to media content items across any number of user devices, and providing other cloud-based media content management services described herein.

To illustrate a high-level example of a cloud-based media content management system interacting with various media devices, assume a user schedules a recording of a television program at a first media device (e.g., at a DVR in the user's home). In response to the user scheduling the recording, the user's first media device tunes to the television program at the scheduled recording time to record the television program. Data indicating that the user scheduled the recording of the television program may be sent to the cloud-based media content management system and stored in association with user account information for the user. The user's first media device further may be configured to upload all or a portion of the recorded television program to a cloud storage system associated with the media content management system. Other portions of the same television program may be uploaded by other media devices associated with other users. The user may then request playback of the television program using one of the user's media devices, and the cloud-based media content management system may stream a copy of the television program from the cloud storage system to the requesting device.

In one embodiment, to comply with applicable content rights related to copying and transmitting media content items stored in a cloud storage system, access to the stored media content items may be restricted based on user account data indicating, for each user account, which media content items a user has selected for recording at one or more of the user's local media devices. For example, in response to a request from a media device to stream a media content item from cloud storage, a cloud based media content management system may enable the media device to stream the content only if the system determines that the device is associated with a user account that previously requested a recording of the same media content item. Furthermore, a cloud-based media content management system may store media content items in such a way that enables the system to provide users access to copies of media content items that are identical or substantially the same as a version of the media content items originally recorded and/or played at each user's local media device, including any regional advertisements, video and/or audio corruptions, and other attributes that may be specific to the media content received by one or more particular media devices.

In addition to managing storage and access to media content items across users' media devices, a cloud-based media content management system may enable a number of additional features that are not traditionally possible with standalone media devices. For example, a cloud-based media content management system as described herein may enable users to easily upgrade or replace media devices without losing access to previously recorded media content items, to concurrently record more media content items than there are physical tuners available to a user, to store recordings of more media content than a user has local storage to accommodate, and to automatically adjust recording start and end times to accommodate changes in program airing schedules, among other features.

In other aspects, the invention encompasses a computer apparatus and a computer-readable medium configured to carry out the foregoing techniques.

2.0. Structural Overview

2.1. System Overview

FIG. 1 is a block diagram of an example system 100 that implements a cloud-based media content management system, in accordance with one or more embodiments. System 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, a system 100 includes one or more media devices 108, including media devices 108-1 and media devices 108-2. As used herein, a media device 108 generally may refer to any type of computing device that is capable of receiving media content items, such as television programs, movies, video on demand (VOD) content, etc., from a cable signal, terrestrial signal, digital network-based data, etc. In FIG. 1, for example, a media device 108-1 may include a TV-tuner input that can be used to play, record, stream, and/or otherwise access media content items received from one or more content sources 106. For example, one content source 106 may include a live television feed that is provided by a cable operator. Other example content sources 106 include, but are not limited to, Video On Demand (VOD) libraries, third party content providers (e.g., Netflix®, Amazon Prime®, etc.), web-based media content, satellite broadcast content, terrestrial broadcast content, etc. Example media devices 108-1 include, but are not limited to, a set-top box (STB), digital video recorders (DVRs), personal computers, tablet computers, handheld devices, televisions, and other computing devices.

In an embodiment, system 100 may further include one or more IP-enabled media devices 108-2. In general, an IP-enabled media device 108-2 may refer to any type of computing device that is capable of receiving media content over one or more digital networks 104, such as the public Internet, intranet, LAN, WAN, etc., but which may or may not include a TV-tuner input. Examples of media devices 108-2 include, without limitation, STBs, DVRs, personal computers, smartphones, tablets, laptops, game devices, media servers, digital media receivers, televisions, terrestrial antennas, etc. A typical user may own several media devices 108, which may be located and used at various locations throughout the user's home and elsewhere.

In an embodiment, media devices 108 are coupled to a cloud-based media content management system 102 via one or more networks 104. Networks 104 broadly represent one or more LANs, WANs, cellular networks (e.g., LTE, HSPA, 3G, older technologies, etc.), and/or internetworks using any of wired, wireless, terrestrial microwave, or satellite links, and may include the public Internet. Furthermore, each media device 108 may be coupled to one or more other media devices via one or more networks 104.

As described in more detail hereinafter, each media device 108 generally may be configured to perform one or more actions relative to media content items, including receiving media content items from content sources 106, playing media content items, scheduling recordings of media content items, uploading all or portions of media content items to a cloud storage system, streaming media content items to other media devices, etc. In an embodiment, a cloud-based media content management system 102 generally manages storage of media content items and provides media devices controlled access to media content items via one or more networks 104.

System 100 illustrates only one of many possible arrangements of components configured to provide the functionality described herein. Other arrangements may include fewer, additional, or different components, and the division of work between the components may vary depending on the arrangement.

In FIG. 1, the various components of system 100 are depicted as being communicatively coupled to various other components by arrows. These arrows illustrate only certain examples of information flows between the components of system 100. Neither the direction of the arrows nor the lack of arrow lines between certain components should be interpreted as indicating the existence or absence of communication between the certain components themselves. Indeed, each component of system 100 may feature an open port, API, or other suitable communication interface by which the component may become communicatively coupled to other components of system 100 as needed to accomplish any of the functions of system 100 described herein.

2.2. Example Service Provider System

Figure 2:
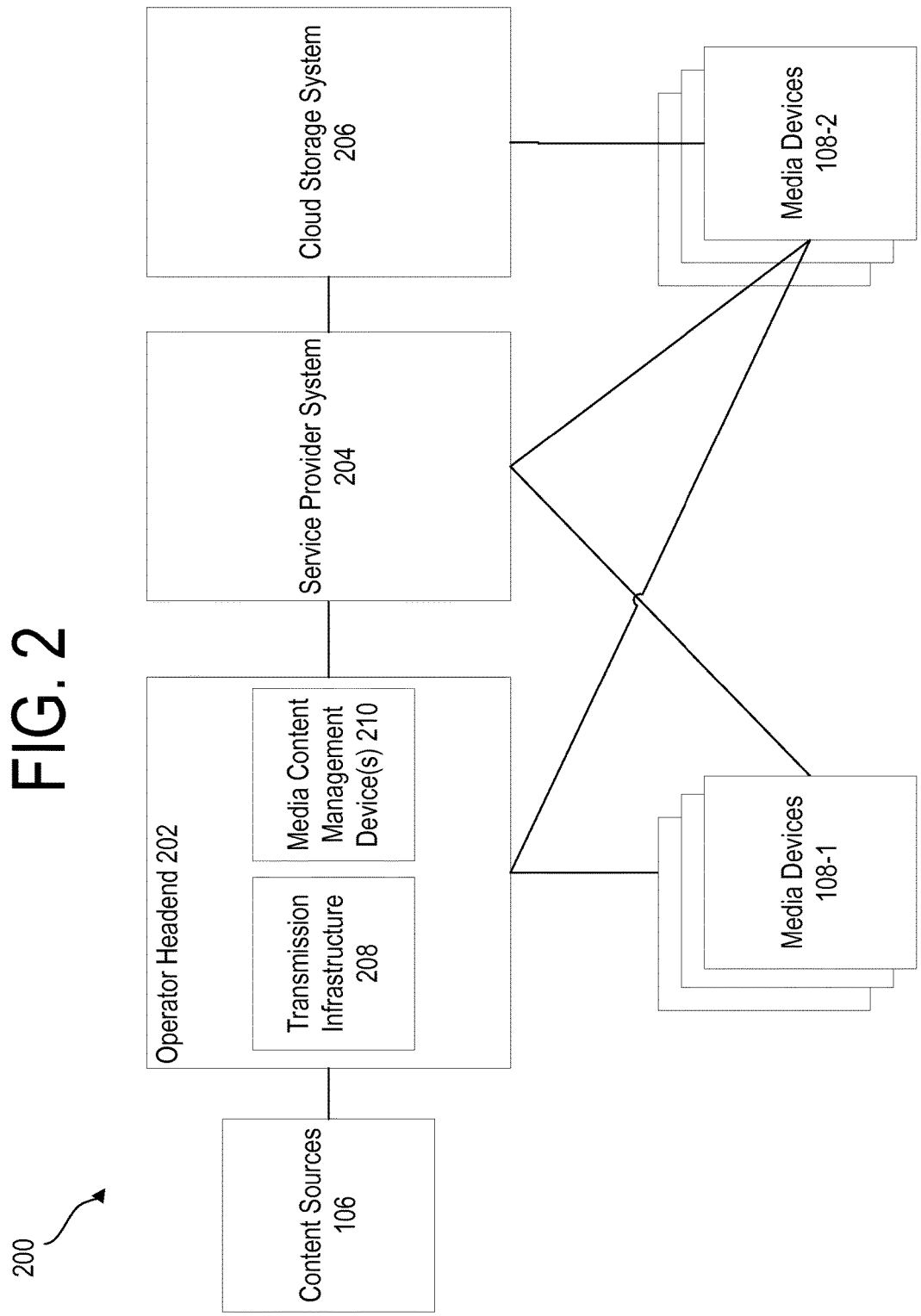
FIG. 2 is a block diagram of components of a cloud-based media content management system, in accordance with one or more embodiments.

FIG. 2 is a block diagram of one example system 200 that implements a cloud-based media content management system, in accordance with one or more embodiments. System 200 includes an operator headend 202, a service provider system 204, and a cloud storage system 206.

In an embodiment, an operator headend 202 generally represents a system for receiving and processing television and other media content signals from one or more content sources 106, and for distributing media content items based on the media content signals to various media devices 108. As one example, an operator headend 202 may represent a cable television headend that receives and processes signals (e.g., received via satellite, coaxial cable, microwave link, fiber-optics, the Internet, etc.) from content sources 106, and distributes the processed video content to media devices 108 using a transmission infrastructure 208. Transmission infrastructure 208 generally may include components capable of transmitting media content items using any number of encoding and transmission formats including, but not limited to, quadrature amplitude modulation (QAM), Advanced Television Systems Committee (ATSC), satellite, Digital Video Broadcasting-Terrestrial (DVB-T), IP-based transmission over one or more networks, etc.

In one embodiment, an operator headend 202 may host one or more media content management devices 210. In general, media content management devices 210 may include one or more computing devices and storage components configured to store media content items and to provide access to the media content items by media devices 108. In an embodiment, user accounts associated with the cloud-based media content management system may be provided with an amount of storage at media content management devices 210 to store media content items selected for recording. The user accounts may, for example, be created and managed by a service provider system 204, and each user account may be associated with one or more media devices 108 (e.g., based on a user account login at the media devices). Media content items stored at media content management devices 210 may be delivered to media devices 108 by the operator headend 202 using a transmission infrastructure 208.

In an embodiment, a cloud-based media content management system may further include one or more cloud storage systems 206. In general, a cloud storage system 206 represents a data storage system that is accessible to media devices 108 via one or more networks (e.g., a network 104) and is typically owned and managed by an entity other than a user of the media device 108. In an embodiment, a cloud storage system 206 may be managed and operated by an operator of a service provider system 204, or a cloud storage system 206 may be operated by a third-party entity. Examples of third-party cloud storage systems include Amazon Web Services (AWS), Microsoft Azure, Google Cloud Storage, etc. Similar to storage available at an operator headend 202, user accounts associated with a service provider system 204 may be provided with an amount of storage space at cloud storage system 206. The amount of storage available to each user account at media content management devices 210 and/or cloud storage system 206 may be presented to users as a single pool of available data storage or, in other examples, a user may be able to separately manage storage available at media content management devices 210 and at a cloud storage system 206.

In one embodiment, a cloud storage system 206 generally may be used to store media content items selected for recording by users of media devices 108. Media content items stored in cloud storage system 206 may be made available to users of media devices 108 until the media content items are selected for deletion by a user, exceed a cloud storage deletion policy, or based on any other deletion policy. In one embodiment, media content received by the operator headend 202 from content sources 106 may be delivered to the cloud storage system 206 via a fixed-bandwidth line to facilitate storage of media content items selected for recording by users.

In an embodiment, a service provider system 204 comprises one or more computing devices generally configured to manage requests from media devices 108 (e.g., media content information and search requests, recording requests, playback requests, content deletion requests, pause point management across devices, etc.), and to manage storage of media content items across one or more operator headends 202 and cloud storage systems 206, among other services and features described herein.

Based on various factors, it may be more efficient at times to stream stored media content items from media content management devices 210 at an operator headend 202 instead of from a cloud storage system 206, and vice versa. For example, a transmission infrastructure 208 of an operator headend 202 typically may be more reliable and have greater bandwidth capacity than networks available for transmitting media content items from a cloud storage system 206 to media devices 108. However, a transmission infrastructure 208 may not be capable of transmitting media content items to some types of media devices 108 (e.g., mobile devices that are not connected to the transmission infrastructure 208), and some media content formats may not be suitable for transmission by an operator headend 202. In these and other instances, for example, it generally may be more efficient to stream the media content items from a cloud storage system 206.

To facilitate streaming of media content items from either an operator headend 202 or cloud storage system 206 when appropriate, in one embodiment, a service provider system 204 may be configured to determine which media content items to store at the operator headend 202, which media content items to store at cloud storage systems 206, or both. For example, a service provider system 204 may determine which media content items selected for recording by one or more users are most likely to be viewed within a particular amount of time or with a particular frequency. For media content items which it is determined are likely to be watched soon after the items are selected for recording, for example, those items may be stored at the operator headend 202. Storage of these items at the operator headend 202 may be beneficial, for example, to take advantage of the more robust transmission infrastructure 208. In contrast, media content items that are determined to be unlikely to be selected for viewing in the near future, or are likely to be viewed on a media device that is not connected to a transmission infrastructure 208, may be stored at a cloud storage system 206 to reduce the amount of data stored at the operator headend 202.

Example criteria that a service provider system 204 may use to determine where to store media content items include information about particular media content items and historical data for one or more user accounts. For example, the criteria may include an age of the media content item (e.g., measured from an original air date), a user's recent viewing behavior (e.g., whether the user recently watched an earlier episode in the same series), an overall popularity of the media content items across all user accounts, the aggregated viewing habits across media devices 108 in a particular household, a rate at which a user is currently viewing episodes in a series and the number of episodes remaining, etc.

In one embodiment, a service provider system 204 may use various criteria such as the example criteria described above to generate a weighting factor, also referred to herein as a relevancy factor, for each media content item selected for recording by a user account. For example, a relevancy factor may indicate for each media content item a likelihood that a request to play the media content item is received within the next N days, or within some other time period. A relevancy factor may be generated for each media content item relative to an entire populations of user accounts, a targeted group of user accounts, or for individual user accounts. In an embodiment, the relevancy factors may be used to determine where to store particular media content items (e.g., at an operator headend 202 and/or cloud storage system 206), video and/or audio formats in which to store particular media content items, bit rates at which to store and/or transmit particular media content items, etc. In an embodiment, a relevancy factor may be used to determine if and when to generate and store transcoded versions of particular media content. For example, if a user pauses a media content item being viewed in the user's home, depending on a relevancy factor associated with the media content item, a transcoded version of the media content item may be generated and stored in the cloud storage system 206, the transcoded version suitable for playing on a mobile device. As another example, depending on a relevancy factor, a service provider system 204 may decide to maintain in storage only a single low bitrate recording of the media content item if the media content item is determined unlikely to be watched in the near future.

As one example of how a cloud-based media content management system 200 may manage transmission and storage of media content items, when a media device 108 tunes to live media content (e.g., a live television stream), the selected media content may be provided to the media device 108 by an operator headend 202 via a transmission infrastructure 208 (e.g., a QAM infrastructure). If a user of the media device 108 pauses playback of the live media content, in one embodiment, a service provider system 204 may cause a recording of the same media content to start at the operator headend 202 and/or at a cloud storage system 206. When the user resumes playback of the media content item from the same media device 108 or from another media device 108 associated with the user's account, the media content item may then be streamed to the media device 108 via an IP-based network from either the operator headend 202 or cloud storage system 206. If the user subsequently catches up to the live point of the media content item, the cloud-based media content management system 200 may continue to stream the media content item to the media device 108 via an IP-based network, or may instead resume transmission of the media content item using the transmission infrastructure 208.

As another example of the cloud-based media content management system 200 managing transmission and storage of media content items, a service provider system 204 may be configured to store at an operator headend 202 and/or cloud storage system a "live buffer" of media content tuned to by one or more media devices 108. For example, each time a media device 108 tunes to a receive a particular media content item, service provider system 204 may start a recording of the media content item at operator headend 202 and/or cloud storage system 206, where the recording is managed as a rolling buffer of a configurable duration of time (e.g., 30 minutes). The rolling buffer for a particular media content item may be automatically deleted after a media device tunes to different media content (e.g., in response to a channel change, selection of different content from an EPG, etc.), or the buffer may be maintained in storage for a configurable period of time (e.g., 30 minutes). If a user subsequently selects a particular media content item to record, the rolling buffer can be used as part of the recording stored for the user, among other uses.

Although FIG. 2 includes an operator headend 202 that receives media content from content sources 106, distributes the media content to media devices 108, and that also may be a source of media content items stored in a cloud storage system, other implementations may not directly involve an operator headend 202. In one embodiment, media devices 108 may receive media content items from content sources 106 (e.g., via an operator headend 202 or directly from a content source 106 via an IP network) and the media content items may be uploaded from the media devices 108 to cloud storage. For example, the content sources 106 may include providers of over-the-top content (OTT), video on demand (VOD), and other content that is transmitted to media devices 108 over the Internet and without the involvement of a cable or satellite television system operator. In this and other examples described herein, a service provider system 204 may not directly interface with an operator headend 202 to enable storage and access to media content items in cloud storage.

2.3. Example Service Provider System

Figure 3:
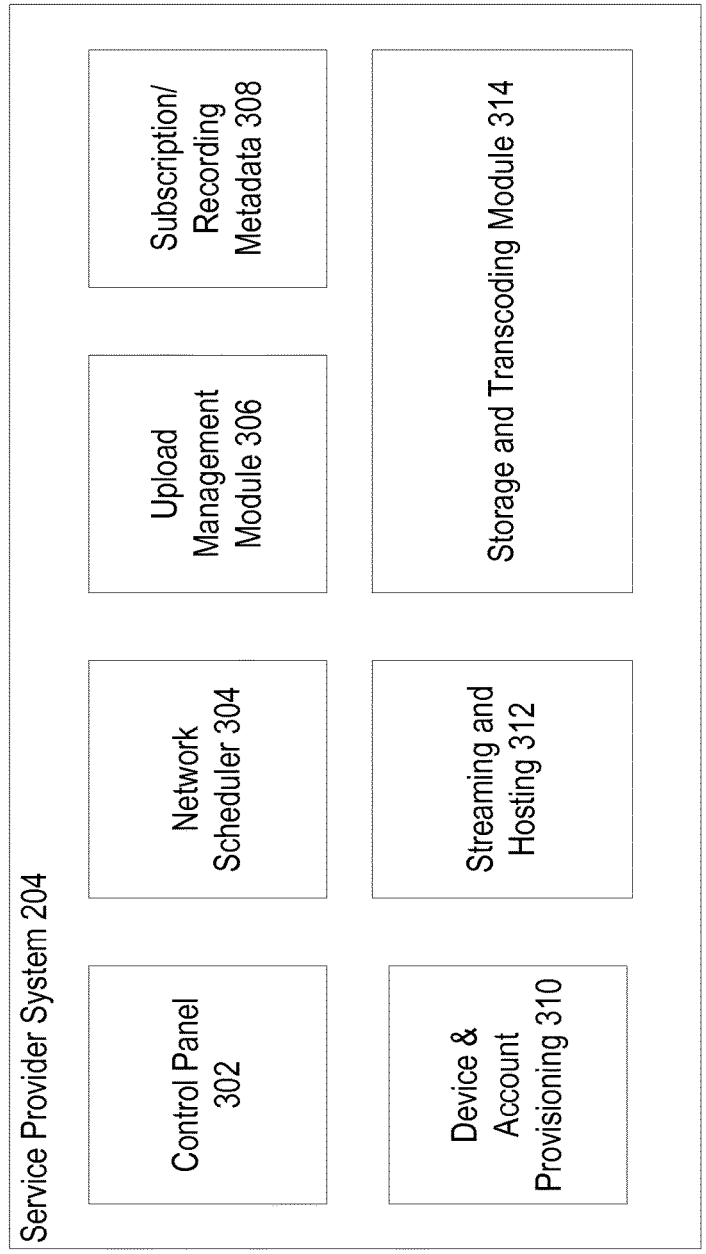
FIG. 3 is a block diagram of components of a service provider system, in accordance with one or more embodiments.

FIG. 3 is a block diagram of components of an example service provider system 204. In general, a service provider system 204 may be configured to manage storage (e.g., at an operator headend 202 and/or cloud storage system 206) and access to media content items by various media devices 108. In one embodiment, each media device 108 may be associated with one or more user accounts that enable a service provider system 204 to track media content items scheduled for recording by particular users, to manage storage of uploaded media content items for each user account, and to manage access to media content items across user devices, among other features. In an embodiment, a service provider system 204 may include a control panel module 302, a network scheduler module 304, an upload management module 306, subscription/recording metadata 308, a device and account provisioning module 310, a streaming and hosting module 312, and a storage and transcoding module 314.

Storage and transcoding module 314 generally may include one or more components configured to manage storage and transmission of media content items received from one or more content sources 106 and/or media devices 108. In on embodiment, storage and transcoding module 314 may include and/or interface with one or more components located at an operator headend 202 and/or cloud storage system 206 that are configured to store media content items. Storage and transcoding module 314 may further include one or more components configured to manage storage and access to media content items uploaded from a population of media devices 108.

In one embodiment, a storage and transcoding module 314 may be configured to manage storage space available to users of media devices 108 for storing recorded media content items and other data. For example, user accounts may be associated with an amount of cloud storage for storing media content items selected for recording by a user associated with the user account. A total amount of storage space associated with each user account may depend on a paid subscription level, an amount of storage purchased by the user, or based on any other user account considerations.

In general, a storage and transcoding module 314 may be configured to enable users to store at any one point in time an amount of recorded media content that does not exceed a total amount of storage space associated with the user account. For example, if a particular user account is associated with 10 GB of total cloud storage space, a user associated with the user account may cause up to 10 GB of media content items to be stored in cloud storage. However, it is noted that an amount of storage space associated with each user account may represent a "virtual" amount of storage, meaning the amount of storage space associated with media content items recorded by the user account may not reflect an actual amount of storage space used to store the media content items stored for that user account. For example, if two user accounts each record the same media content item, an amount of used storage space associated with each of the two user accounts may be increased by the size of the media content item, however, only one shared copy of the media content item may actually be stored by storage and transcoding module 314. Other possible rules may be implemented to determine how media content items selected for recording by a user count against a user's total available storage space, such as dividing the storage space associated with a particular media content item by a number of users who recorded the same media content item. In one embodiment, a service provider system 204 may enable users to upgrade the storage associated with a user account in ways other than increasing total storage space, such as upgrading the storage to provide access to other transcoded versions of stored media content items (e.g., different transcoded versions for different types of devices on which the user desires to view the media content items).

Media content items scheduled for recording may be processed by a storage and transcoding module 214 before the media content items are sent to one or more media devices 108, or the media content items may be sent directly to media devices 108 and later uploaded to a storage and transcoding module 314 from the media devices.

In one embodiment, a storage and transcoding module 314 may include one or more application program interfaces (APIs) configured to receive and process commands to play, record, delete, create copies, or perform other operations related to media content items managed by the storage and transcoding module 314. For example, such commands may be generated and received from a network scheduler module 304, a media device 108, or other component of a cloud-based media content management system.

In an embodiment, a streaming and hosting module 314 is configured to stream, download, or otherwise send media content items stored in cloud storage to media devices 108. Streaming and hosting module 314 may, for example, include one or more servers that are part of a content delivery network (CDN) and configured to deliver media content items and other data to a distributed population of media devices 108. In an embodiment, a streaming and hosting module 314 may further be configured to perform one or more transformations to media content items sent to media devices 108, including converting stored media content segments into a format suitable for delivery over one or more networks 104, transcoding media content items for particular types of media devices 108, and performing any other types of data transformations before sending media content items to media devices.

In an embodiment, a service provider system 204 includes one or more components for managing user accounts, including managing user account-based recording schedules, access to media content items across media devices 108, pause point information, etc. A network scheduler module 304 may, for example, be similar to a scheduling component of a media device 108, such as a DVR. In one embodiment, a network scheduler module 304 is configured to receive requests to schedule recordings of media content items from various media devices 108, each media device associated with a user account. For example, a user may use a first media device to schedule a recording of a particular television program by a second media device. In an embodiment, the first media device may send a request for the recording to a network scheduler module 304. At or before the scheduled recording time, a network scheduler module 304 may then send a command to the second media device instructing the second media device to record the television program. In an embodiment, network scheduler module 304 may additionally or alternatively send a command to storage and transcoding module 314 instructing the module to receive and store the requested television program directly from a content source 106.

In one embodiment, various aspects of the service provider system 204 may be configured via a control panel 302. For example, a control panel 302 may provide one or more interfaces that enable content providers and/or media device users to configure various settings relating to the cloud-based media content management system. Examples of settings that may be configured by a media content provider include selectively allowing or denying users the ability to store recordings in a cloud storage system on a per-channel or per-media content airing basis, an amount of storage space available to each user, restrictions on physical locations to which media content items provided by the operator may be sent from cloud storage, etc. Location restrictions, for example, may indicate that media content items provided by the operator may be sent only to media devices 108 that are accessible via a user's home network, sent only to media devices accessible over the content provider's network, or that media content items may be sent anywhere. A content provider may configure a time limit specifying how long media content items provided by the content provider may be accessed from cloud storage (e.g., 28 days after airing or 7 days after recording). Other configurations may include a number of concurrent streams each user account is allowed, a duration of time each media content item is allowed to be stored in cloud storage, whether users are permitted to undelete media content items, whether users are able to record previously aired content, whether trick play is enabled, etc.

In an embodiment, a control panel 302 may further provide one or more interfaces for end users to configure various aspects of the service provider system 204. For example, one or more interfaces may be provided that enable users to configure an amount of cloud storage available to a user, to purchase additional storage space, and to configure and/or purchase a number of virtual tuners available for use by user. A control panel 302 may further include one or more interfaces that enable users to manage media content items currently stored by the user in cloud storage, manage sending media content items to particular media devices associated with the user, and to configure other aspects of the user's account.

In an embodiment, an upload management module 306 is configured to manage uploads of media content items from a population of media devices 108. For example, a user of a media device 108 may schedule a recording of a movie on the media device. An upload management module 306 generally may be configured to receive an indication that a media device 108 is recording a particular media content item and, in response, may cause the media device 108 to upload one or more segments of the media content item to a storage and transcoding module 314. The storage of media content items in cloud storage may be used to provide users with access to the media content items across media devices 108 associated with each user, as described in more detail hereinafter.

In one embodiment, an upload management module 306 may store and manage one or more device upload efficiency profiles. As used herein, a device upload efficiency profile generally specifies various attributes and values related to how media devices 108 process and upload media content items to a service provider system 204. As described in more detail hereinafter, a device upload efficiency profile may, for example, specify how a media device defines segments of a media content item and how often a media device 108 checks defined segments for consistency with a service provider system 204. A media device 108 may store several different profiles and change which profile is in current use based on the occurrence of certain conditions. In an embodiment, an upload management module 306 may further generate and distribute new or modified device upload efficiency profiles to media devices 108 in response to conditions determined by a service provider system 204.

In one embodiment, a service provider system 204 may include subscription and recording metadata 308, including metadata related to media content items selected for recording by users of media devices 108. For example, the metadata may include information that identifies media content items selected for recording by particular user accounts, media content items selected for deletion, or any other information related to the operation of the media devices. The subscription and recording metadata 308 may further include data indicating subscription information related to particular user accounts, including available content sources, allocated storage amounts, etc.

In an embodiment, device and account provisioning module 310 may be configured to enable creation and management of user accounts, and to manage the association of user accounts with one or more media devices 108. A user of one or more media devices 108 may be associated with a user account that enables a service provider system 204 to store and track information about the user across different media devices. For example, a service provider system 204 may store information in association with each user account including information about user subscriptions to particular content sources 106, metadata about media content items recorded by the user account, user preferences, user profile information, user viewing history, etc. In an embodiment, user accounts may be associated with authentication information (e.g., a username and password) that enables users to associate particular media devices 108 with particular user accounts. For example, a user may associate a particular media device 108 with a user account by providing a username and password or other authentication information at the media device 108.

2.4. Example Media Device

Figure 4:
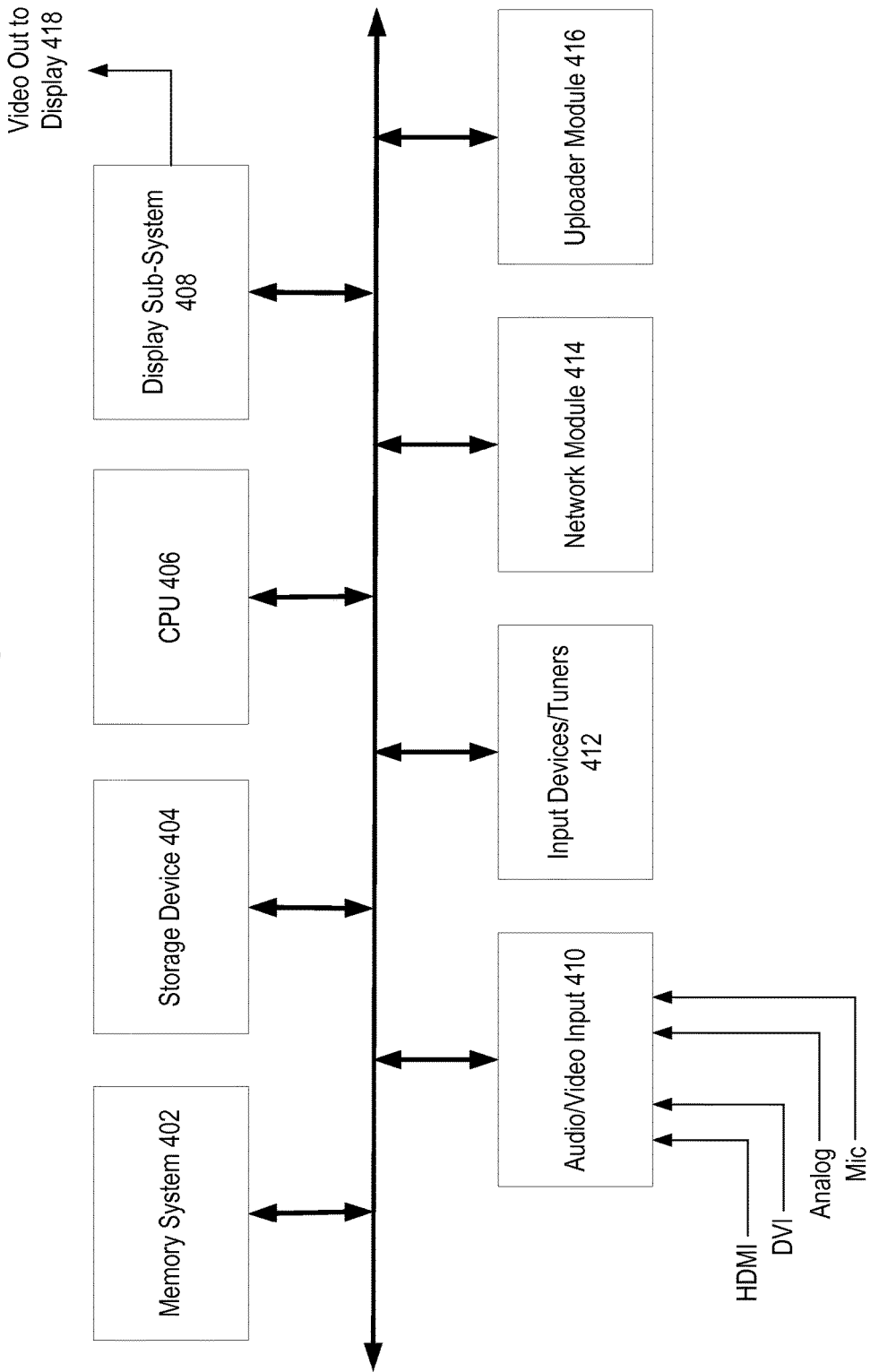
FIG. 4 is a block diagram of an example media device, in accordance with one or more embodiments.

FIG. 4 illustrates an example block diagram of a media device in accordance with one or more embodiments. As shown in FIG. 4, a media device 108 may include multiple components such as a memory system 402, one or more storage devices 404, a central processing unit (CPU) 406, a display sub-system 408, an audio/video input 410, one or more input devices/tuners 412, a network module 414, an uploader module 416, and/or other components used to perform the functionality described herein. In an embodiment, a media device 108 may be a DVR. A multifunction media device is described U.S. patent application Ser. No. 12/631,740, entitled "Multifunction Multimedia Device," which is owned by the Applicant and is hereby fully incorporated by reference.

In an embodiment, storage devices 404 generally represent secondary storage accessible by the media device 108. A storage device 404 may include, but is not limited to, any combination of, one or more of: Solid State Drives (SSD), hybrid hard drives, hard drives, etc. Each media device 108 may or may not include one or more storage devices 404. If a media device 108 includes a storage devices 404, the storage may be used for various purposes including storing all or portions of recorded media content items, providing a buffer for media device tuners 412, pre-caching portions of media content items stored by a cloud storage system, etc.

In an embodiment, audio/video input 410 generally corresponds to any component that includes functionality to receive audio and/or video input (e.g., HDMI, DVI, Analog) from an external source. For example, the audio/video input 410 may be a DisplayPort or a high definition multimedia interface (HDMI) that can receive input from different devices. The audio/video input 410 may receive input from a set-top box, DVR, a Blu-ray disc player, a personal computer, a video game console, an audio/video receiver, a compact disk player, an enhanced versatile disc player, a high definition optical disc, a holographic versatile disc, a laser disc, mini disc, a disc film, a RAM disc, a vinyl disc, a floppy disk, a hard drive disk, etc. A media device 108 may include any number of audio/video inputs 410.

In an embodiment, input device/tuners 412 generally represents any input components that can receive a content stream (e.g., through cable, satellite, internet, network, terrestrial antenna, etc.). In a tuner configuration, input device/tuner 412 may allow one or more received frequencies to pass through while filtering out others (e.g., by using electronic resonance, etc.). A television tuner, for example, may convert an RF television transmission into digital audio and video signals which can be further processed to produce sound and/or an image or accept digital signals such as MPEG2, MPEG4, etc. In an embodiment, each media device 108 may have one or more tuners (e.g., quadrature amplitude modulation (QAM) tuners, Digital Video Broadcasting-Cable (DVB-C) tuners, Advanced Television Systems Committee (ATSC) tuners, etc.) for receiving live or on-demand television content from content sources 106. A tuner can be a physical tuner or a virtual tuner that represents an abstract perception of physical components used to receive broadcast content.

In an embodiment, a network module 414 generally represents any input component that can send and receive data over a network (e.g., internet, intranet, world wide web, etc.). Examples of a network module 414 include, but are not limited to, any of: a network card, network adapter, network interface controller (NIC), network interface card, wireless card, Local Area Network adapter, Ethernet network card, any other component that can send and receive information over a network, such as one or more networks 104. The network module 414 may also be used to directly connect with another device (e.g., a media device, a computer, a secondary storage device, etc.).

In an embodiment, an uploader module 416 is configured to manage uploads of media content items from a media device 108 to cloud storage (e.g., storage at an operator headend 202, service provider system 204, and/or cloud storage system 206). In one embodiment, an uploader module 416 includes one or more device efficiency profiles. A device efficiency profile generally represents a set of information that specifies one or more attributes, parameters, and other settings related to how a media device 108 segments and uploads media content items. As indicated above, examples of settings that may be specified in a device efficiency profile include how a media device defines a segment and a frequency with which the media device checks each segment for consistency.

In one embodiment, a media device 108 may switch between device efficiency profiles in response to the occurrence of particular conditions. For example, a media device 108 may be configured to switch profiles if the media device determines that it has received one or more segments containing errors, or if the media device determines that network conditions have changed.

In one embodiment, a media device 108 may be configured to periodically determine and send statistics related to the operation of the media device, including network bandwidth usage, segmentation speed, or any other statistics. The data collected by each media device 108 may be sent and stored by a service provider system 204. In one embodiment, the service provider system 204 may use the statistical data when selecting particular media devices 108 from which to upload media content segments, to modify or create new device efficiency profiles, or for any other purposes.

In an embodiment, input may be received by a media device 108 from any communicatively coupled device through wired and/or wireless communication segments. Input received by the media device 108 may be stored to the memory system 402 or storage device 404. The memory system 402 may include one or more different types of physical memory to store data. For example, one or more memory buffers (e.g., an HD frame buffer) in the memory system 402 may include storage capacity to load one or more uncompressed high definition (HD) video frames for editing and/or fingerprinting. The memory system 402 may also store frames in a compressed form (e.g., MPEG2, MPEG4, or any other suitable format), where the frames are then uncompressed into the frame buffer for modification, fingerprinting, replacement, and/or display. The memory system 302 may include FLASH memory, DRAM memory, EEPROM, traditional rotating disk drives, etc.

In an embodiment, central processing unit 406 may include functionality to perform the functions described herein using any input received by the media device 108. For example, the central processing unit 406 may be used to dynamically derive fingerprints from media content frames stored in the memory system 402. The central processing unit 406 may be configured to mark or identify media content or portions of media content based on tags, hash values, fingerprints, time stamp, or other suitable information associated with the media content. The central processing unit 406 may be used to modify media content (e.g., scale a video frame, etc.), analyze media content, decompress media content, compress media content, etc. A video frame (e.g., an HD video frame, 4K frame, etc.) stored in a frame buffer may be modified dynamically by the central processing unit 406 to overlay additional content (e.g., information about the frame, program info, a chat message, system message, web content, pictures, an electronic programming guide, video content, textual content, or any other suitable content) on top of the video frame, manipulate the video frame (e.g., stretching, rotation, shrinking, etc.), or replace the video frame in real time. Accordingly, an electronic programming guide, advertisement information that is dynamically selected, media content information, or any other text/graphics may be written onto a video frame stored in a frame buffer to superimpose the additional content on top of the stored video frame. The central processing unit 406 may be used for processing communication with any of the input and/or output devices associated with the media device 108. For example, a video frame that is dynamically modified in real time may subsequently be transmitted for display. The central processing unit 406 may be used to communicate with other media devices to perform functions related to synchronization, publication of data, etc.

In an embodiment, the display sub-system 408 generally represents any software and/or device that includes functionality to output (e.g., Video Out to Display 418) and/or actually display one or more images. Examples of display devices include a kiosk, a hand held device, a computer screen, a monitor, a television, projector, etc. The display devices may use different types of screens or display technology such as a liquid crystal display, cathode ray tube, a projector, a plasma screen, etc. The output from the media device 108 may be specially for formatted for the type of display device being used, the size of the display device, resolution (e.g., 720i, 720p, 1080i, 1080p, or other suitable resolution), etc. However, some media devices 108 may not have any display output components (e.g., a media device primarily configured to stream media content items to other media devices).

3.0. Functional Overview

The example arrangements of FIG. 1 and FIG. 2 may implement a media content management system that enables storage and access to media content items in a cloud-based computing environment. In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising media devices (e.g., DVRs, set-top boxes, personal computers, mobile devices, etc.) which may receive, play, record, and/or store media content items and a cloud-based media content management system which manages user access to media content items. In other embodiments, the processes are implemented exclusively by one or more servers or by a single client computing device. Examples of such systems are described in the preceding sections.

In one embodiment, a cloud-based media content management system is configured to centrally manage storage and access by a population of media devices to media content items. Managing storage of media content items generally may include, for example, recording a copy of selected media content items using cloud-based tuners and/ or coordinating media content uploads from a population of media devices, and storing uploaded media content items in a manner that enables subsequent playback. Managing access to media content items may include, for example, restricting access to media content items stored in cloud storage on a user account basis, providing access to copies of media content items that approximate a version of the media content item originally received by media devices, and enabling upgrading and replacement of media devices without losing access to previously recorded content. These and other features and services of a cloud-based media content management system are described in the sections hereinafter.

In one embodiment, media content items stored by a cloud-based media content management system may be uploaded from a population of media devices at which the media content items are initially received. For example, if several media devices each record a particular television program, a copy of the television program may be recorded by each of the media devices and collectively uploaded by the devices to cloud storage for subsequent access. Managing uploads of media content items from a population of media devices may be greatly improved using techniques that reduce an amount of data uploaded from each individual media device and that further reduce an amount of data stored by a cloud-based media content management system. By reducing an amount of data uploaded from individual media devices, the user experience is improved by utilizing less of the bandwidth available to each media device and thereby increasing the efficiency with which recorded media contents may be accessed from cloud storage at any of a user's media devices.

3.1. Distributed Media Device Upload

In one embodiment, to provide cloud storage of media content items recorded at various media devices, the media devices may upload entire copy of media content items recorded by the media devices to a cloud-based media content management system. However, storage space and bandwidth constraints at both the media devices and the media content management system present a number of challenges to uploading and storing a separate copy of each media content item recorded. Thus, it generally may be desirable to reduce an amount of data uploaded by each individual media device and to further reduce the amount of data stored at the cloud-based media content management system.

In one embodiment, to reduce media device uploads and cloud storage space requirements, a population of media devices may each upload to a media content management system only portions of media content items recorded at the media devices in a distributed manner. For example, each media device that schedules a recording of a particular media content item may upload one or more selected segments of the media content item. As described in more detail hereinafter, in one embodiment, a centralized media content management system may coordinate the distributed upload of media content items from the population of media devices so that entire copies of the media content items are received and stored, but without uploading a separate copy of the entire media content items from every media device.

Figure 5:
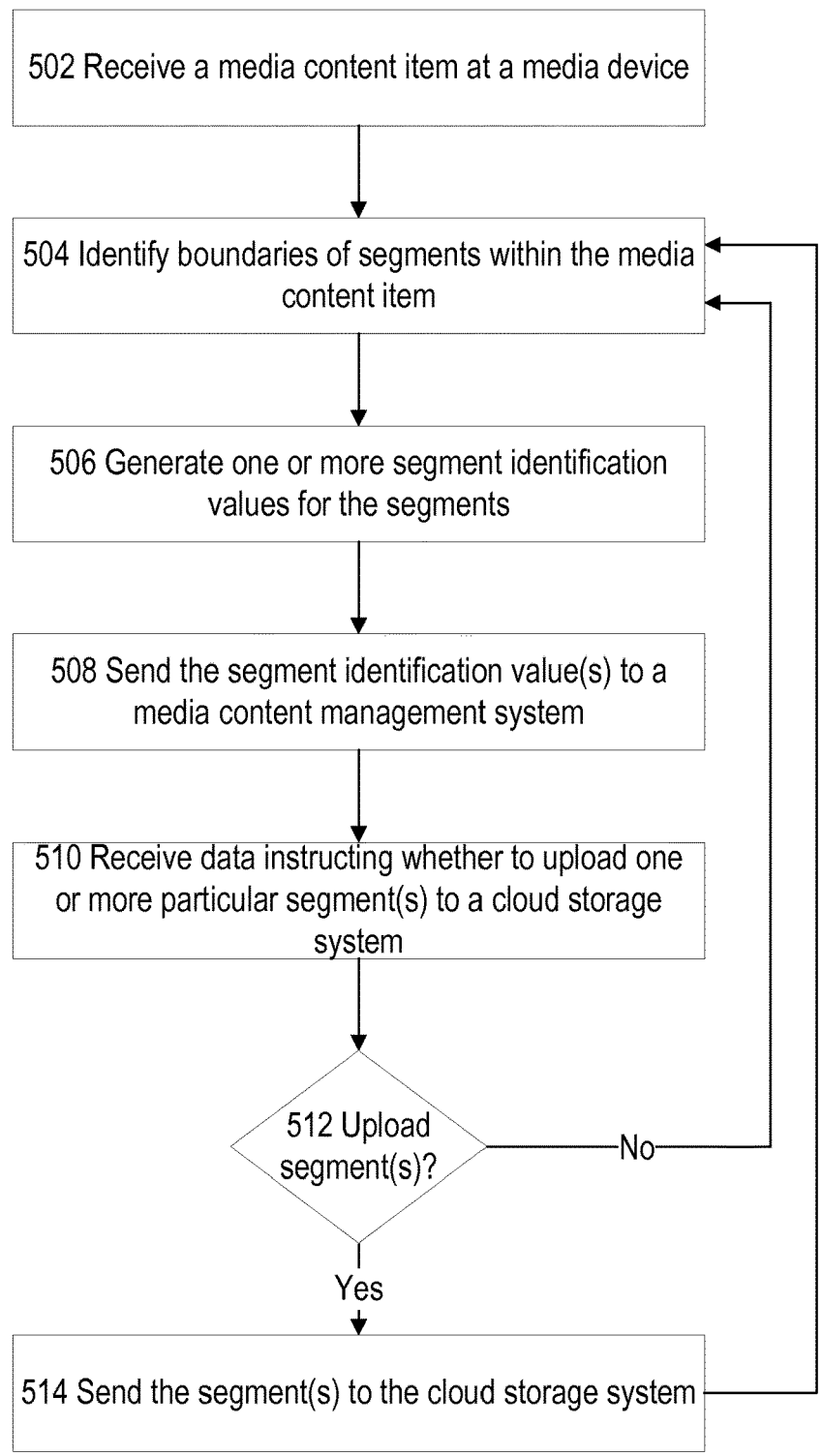
FIG. 5 depicts an example flow diagram for managing uploads of media content items at a media device, in accordance with one or more embodiments.

FIG. 5 illustrates an example flow 500 for media devices to manage uploading of media content items in a distributed environment, according to an embodiment. The various elements of flow 500 may be performed in a variety of systems, including systems such as system 100 and system 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 502, a media device receives a media content item. For example, the media content item may include a television program, a movie, on-demand content, or any other media content selected for recording or viewing by a user of the media device. The media device may tune to the media content item in response to a user selection of the media content item from an electronic programming guide (EPG), a VOD library, a third-party video library, or other listing of available media content.

In one embodiment, a media device may tune to the media content item in response to receiving a command to record the media content item. A command to record the media content item may be initially received at the media device, or at another media device associated with the same user account. For example, a user may provide input at a first media device (e.g., a smartphone) requesting to record a media content item at a second media device (e.g., a DVR). In response to the input, the first media device may send, to a network scheduler module 304 of a service provider system 204 or directly to the second media device, a command to schedule the recording. The second media device may then tune to the media content at the scheduled recording time in response to a command received from the network scheduler module 304, a command received directly from another media device, or based on an internal command. In one embodiment, a command to record the media content item may be received as part of a recording schedule including a list of scheduled recordings. The command to record the media content item generally may be received at the time any time before or during the airing of the media content item.

In an embodiment, a media device tunes to a particular media content item using a tuner 412 or a network module 416 of the media device. For example, a tuner 412 may be configured to receive the content from a content source 106 via an operator headend 202. As another example, if the media content item includes OTT content, a network module 416 of the media device may access the media content via one or more networks (e.g., networks 104). If the media device has permission to access the media content from a content source 106 (e.g., because the user has a subscription with the cable operator or internet-based content source, the media device has the ability to receive the content source based on geographic location or service provider, etc.), the tuner 412/network module 416 of the media device receives the media content item as a content stream for further processing by the media device. Thus, by tuning and receiving the selected media content item, the media device is able to validate that the user account associated with the media device has permission to access the media content.

At block 504, the media device identifies boundaries of segments within the media content item. As used herein, a segment of a media content item generally refers to a defined portion of the media content item, where the portion may span a particular length of time, comprise a particular amount of data, or otherwise comprise a defined collection of data elements that represents a part of the entire media content item. In general, each segment may be defined by segment boundaries that define a beginning and end of the segment. The segment boundaries may be defined, for example, by particular frames within the media content item, by timing information associated with the media content item, by data elements associated with the media content, or based on any other attributes of the media content item, as described in more detail hereinafter.

As indicated above, a cloud-based media content management system may receive media content items from a population of media devices 108 as a distributed upload of individual segments of the media content items, where each individual segment is uploaded from a possibly different media device of the population. For example, if two or more separate media devices each schedule a recording of the same television program, each of the media devices may (or may not) upload one or more segments of the television program, the uploaded segments collectively forming an entire copy of the television program. Some media devices may upload more segments than other media devices recording the same media content item. For example, it may be determined that certain media devices have more available upload bandwidth than others, that certain media devices are receiving a higher quality signal, or other factors that may preference uploads from certain media devices over others.

Because each segment of a particular media content item may be uploaded from any media device of a population of media devices, segmentation rules may be defined for the population of media devices, where the segmentation rules generally define how each media device of the population segments media content items so that a cloud storage system may ultimately receive an entire copy of the media content item. Furthermore, depending on a particular segmentation scheme, various techniques may be used to "synchronize" the segmentation of media content items by a population of media devices.

As one example of a segmentation rule for a population of media devices, each media device may segment media content items received by the devices based on a common clock. For example, each media device may be configured to define segments of a media content item based on a particular time span (e.g., every 6 seconds) according to a common clock. Thus, if a particular media content item is scheduled to air from 05:00 to 06:00, a first segment may include a portion of the content airing between 05:00:00 and 05:00:06, a second segment may include a portion of the content airing between 05:00:12, etc. However, time drifts in the airings of media content items across various geographic locations, even if minor, may result in inaccuracies that hinder consistent segmentation across a population of media devices using a common clock.

In one embodiment, each media device of a population of media devices may be configured to segment media content items based on duration of time that may not be relative to any specific clock. For example, each media device of a population may be configured to identify each segment within a media content item as ten seconds of content. However, because the media devices may not begin counting each ten second segment from exactly the same starting position, any two particular media devices from the population may or may not generate the same segments for the same media content item. The population of media devices may then, for example, be dynamically grouped into a number groups, each group including devices that are defining segments for the media content item at the same boundaries.

In an embodiment, each media device of a population may be configured to segment media content items based on a duration of time and the segmentation of each media device may be synchronized by a centralized media content management system. For example, each media device may initially define the boundaries of one or more segments based on a specified amount of time (e.g., ten seconds). As described in more detail below, a media device may send to the media content management system one or more segment identification values for the initially defined segments. Based on the segment identification values, the media content management system may send data to the media devices that enables the media devices to synchronize the segmentation. For example, if it is determined that a particular media device is defining segments that are one second out of alignment with other media devices, the data may instruct the particular media device to define one nine second segment and then resume defining ten second segments so that the segment boundaries are then synchronized.

As another example of a media content management system assisting a population of media devices to synchronize segmentation, the media content management system may synchronize a media device by receiving from the media device segment identification values based on a number of possible segment boundaries. Based on the segment identification values, the media content management system may send data instructing the media device to use one instance of the segment boundaries from the set of possible segment boundaries. For example, if a media device is configured to identify segment boundaries based on ten seconds of time, the media device may generate segment identification values (e.g., a hash value, checksum, etc.) for a number of overlapping ten second spans within a media content item. The media device may generate a segment identification value for each of the spans, send the segment identification values to the media content management system, and the media content management system may select one of the segments for the media device to use (e.g., based on which segment corresponds to segment boundaries used by other media devices). The media device may then receive instructions from the media content management system to use the selected segment boundaries and generate additional segments based on the selected boundaries.

As another example, a population of media devices may collaboratively synchronize segment identification amongst the devices and without coordination of a centralized media content management system. For example, each media device of a population may identify one or more segments of a media content item, generate segment identification values for the segments, and send the values to one or more other media devices receiving the same media content item. Based on the segment identification values, the media devices may collectively determine particular boundaries on which to base the identification of other segments. For example, the media devices may select segment boundaries that were generated by the greatest number of the media devices, or based on any other selection criteria.

As another example, a population of media devices may be configured based on a pre-defined segmentation rule that defines each segment of a media content as one or more particular collection of frames within the media content item. In one embodiment, each collection of frames may be based on a Moving Picture Experts Group (MPEG) standard specification for audio and video formatting. For example, a segment may be defined as one or more "group of pictures" (GOP) included in the media content item. In the context of the MPEG-4 standard, for example, a GOP generally refers to a group of successive frames within a video stream, where each frame of a media content item is included in one GOP. Metadata included with the media content item may define the GOP boundaries for a particular media content item.

Another example of a segmentation rule may define each segment based on timing metadata information included with media content items. For example, media content items encoded based on an MPEG standard typically include presentation timestamp (PTS) values that indicate an overall clock reference for portions of a media content stream. A media content item thus may be segmented based on ranges of presentation timestamp (PTS) values (e.g., every span of 1000 in PTS values) within the media content item. As another similar example, media content items may be segmented based on ranges of program clock reference (PCR) values, which represent another timing metadata field commonly included with media content items. As yet another example, a segmentation rule may be based on a combination of two or more different elements associated with a media content item. For example, each segment may be defined as a number of GOPs not to exceed a specified span of PTS values.

In general, a media device may identify segment boundaries within a media content item sequentially as a media content stream is received by the media device. For example, if a segmentation rule defines each segment based on ranges of 1000 in PTS values, a media device may identify the boundaries of a first segment within a media content item as a portion of the media content associated with PTS values between 0 and 999, a second segment defined by a portion associated with PTS values between 1000 and 1999, and so forth. The segment boundaries may be identified in real-time as a media content item is received, or at a later time after the media device has received some or all of a media content item. In other examples, a media device may identify segment boundaries out of order with respect to the media content item, selecting particular portions of a media content from which to define one or more segments.

In an embodiment, the size and/or duration of segments defined by each media device of a population of media devices may or may not be uniform across the entire population. For example, each media device may include one or more device efficiency profiles that define, among other attributes, how each particular media device identifies segment boundaries. For example, based on one particular device efficiency profile associated with a particular media device, the media device may be configured to generate segments that are each three seconds in duration, while another media device associated with a different device efficiency profile may be configured to generate segments that are each six seconds in duration. An upload management module 306 or other components of a service provider system 204 may thus include logic configured to assemble segments of different sizes into a complete copy of a media content item for storage.

At block 506, the media device may generate one or more values that identify the defined segments, also referred to herein as segment identification values. In general, a segment identification value can be any value that serves to identify a segment relative to other segments. In one embodiment, for example, segment identification values may be used to compare segments to other segments another for "sameness," the sameness of two segments corresponding to whether the segments represent the same, or substantially the same, portion of a media content item. As described in more detail hereinafter, one or more components of a cloud-based media content management system may compare segments using segment identification values to determine, for example, whether the system has received a copy of the same segment from another media device and to determine whether to instruct media devices whether to upload particular segments to a cloud storage system.

In one embodiment, a segment identification value may include a hash value based on a portion or all of the data comprising a segment. A hash function used by a media device to generate such a value generally may be any function that maps all or a portion of the data comprising the segment to a fixed size value. For example, a hash function may be applied to all of the data comprising a segment, including the media data (e.g., video and audio data) and any metadata associated with the segment (e.g., closed captioning data, timing information, etc.), to generate the segment identification value. In general, assuming the original data is the same for two segments defined by two different media devices, the segments map to the same hash value, while two different segments map to different hash values. This property can be used (e.g., by a media content management system 102) to determine whether two separately defined segments represent the same segment by comparing only the hash values generated for the segments instead of the entire data contents of the segments, thereby increasing the speed of such comparisons. Further, by generating a hash value from all of the data comprising a segment, any difference between two segments can be detected (e.g., because the segments represent a different portion of a media content item, or because one of the segments includes a "glitch" or other data corruption) because any such difference results in a different hash value. Depending on a particular implementation, this level of comparison may or may not be desired.

In an embodiment, rather than generating a segment identification value from the entire data comprising a segment, only a portion of the segment data may be used. For example, a media device may generate a hash value based only on the data from an audio track or a closed caption track associated with the segment. As another example, a media device may generate a segment identification value based on a portion of the data comprising the segment, but that spans the entire time span of the segment. For example, a segment identification value may be based on discrete cosine transform (DCT) coefficients for a set of MPEG frames that span the entire segment. In general, generating a segment identification value from only a portion of the data comprising a segment may be computationally less expensive than using the entire data of the segment; however, because only a portion of the data is used to generate the hash value, differences in other portions of the segment data from one segment to another may go undetected.

As another example, a media device may generate a segment identification value for a particular segment by concatenating one or more series of data derived from a particular segment. For example, a segment identification value may be generated by concatenating a series of PCR, PTS, or other metadata values associated with the segment. As yet another example, a hash function may be applied to a data series derived from the segment. Other examples of data that may be used to generate a segment identification value may include in-band data, service information (SI), and/or event information tables (EIT).

In an embodiment, a segment identification value may include a visual and/or audio fingerprint of the segment. In general, generating a visual fingerprint may involve generating a value based on one or more rendered frames from the video data included in a particular segment. Similarly, generating an audio fingerprint may include generating a value based on audio data. The use of fingerprinting to identify media content items is described in U.S. Pat. No. 8,417,096, entitled "Method And An Apparatus For Determining A Playing Position Based On Media Content Fingerprints," which is owned by the Applicant and is hereby fully incorporated by reference. The use of in-band data to identify media content items is described in U.S. Pat. No. 7,873,982, entitled "Method And Apparatus For Creating And Viewing Customized Multimedia Segments," which is owned by the Applicant and is hereby fully incorporated by reference.

In one embodiment, in addition to generating a segment identification value, a media device may perform one or more error checks on a segment to identify possible data corruption. If a media device detects that a segment exhibits one or more instances of data corruption, for example, the media device may report the error to a media content management system to assist the system in determining whether the media device is to upload a particular segment to cloud storage. One example of an error check may include detecting a discontinuity or other error in metadata values associated with the segment, such as with PCR and/or PTS values. In general, PCR and PTS values increase monotonically with time over the segment, and the media device may flag a segment if the media device detects a decreasing pattern of PCR or PTS values.

At block 508, the media device sends one or more segment identification values to a media content management system. For example, an uploader module 416 of a media device 108 may send the segment identification values for segments defined by the media device to a service provider system 204 via one or more networks 104. A media device 108 may send each generated segment identification value individually, or a collected group of segment identification values corresponding to multiple segments may be sent together. A media device 108 may send segment identification values separate from other data, or the segment identification values may be included with other data sent to the media content management system, including portions of the media content from which the values were derived.

In one embodiment, instead of sending segment identification values individually or in groups, a media device may send one or more values derived from multiple segment identification values. For example, a media device may receive an entire media content item, generate segment identification values for some or all of the segments defined for the media content item, and send a checksum or other value derived from the segment identification values to a media content management system. The media content management system may then use the checksum value to determine whether the media content item is the same as one already stored by the content management system. Sending a single checksum value rather than a group of segment identification values may further reduce an amount of data uploaded from each device.

Depending on various factors, a media device may be configured to send segment identification values for each segment defined by the media device, or for less than all segments defined. In one embodiment, a media device may determine when and/or how frequently to send segment identification values based on one or more device efficiency profiles. For example, a device efficiency profile for one media device may instruct the media device to send segment identification values for the first N defined segments of a particular media content item. The profile may further instruct the media device to send segment identification values for only every other defined segment if the media device receives an indication that some number of previously defined segments were not requested for upload. For example, if a particular media device sends to a media content management system segment identification values for the first hundred segments of a media content item and receives an indication that the media content management system has previously stored those segments (e.g., possibly indicating that other media devices previously uploaded the same media content item), then based on a device efficiency profile, the media device may start generating and/or sending segment identification values for only every other segment, every third segment, etc.

At block 510, in response to sending the one or more segment identification values to the media content management system, the media device may receive data from the media content management system indicating whether to upload one or more particular segments of the one or more identified segments. For example, the data generally may represent upload policy information that includes criteria for a media device to upload particular segments, or instructs the media device to upload particular segments. As described in more detail in reference to FIG. 6, the media content management system may generate the command depending on whether or not the system has already stored the same segment, or is currently receiving a sufficient number of copies of the same segment from other media devices, or based on other factors.

At block 512, the media device determines whether to upload one or more defined segments. For example, the media device may determine to upload one or more segment based on a command received from the media content management system. If the command instructs the media device to upload the segment, then at block 514, the media device sends the segment to a cloud storage system associated with the media content management system 102. For example, the media device may upload the segment data to a storage and transcoding module 214 of a service provider system 204, or directly to a separate cloud storage system 206 and/or storage at an operator headend 202. If the command instructs the media device not to upload the segment (e.g., because a sufficient number of copies of the same segment already exist in cloud storage), then flow 500 proceeds to block 504 and the media device can define another segment of the media content item, if any segments remain. In an embodiment, a media device 108 may continue the process of flow 400 until the end of a media content item, or until a user manually ends the recording.

In one embodiment, a media device may upload one or more segments of a media content item out of order relative to an order in which the segments are received and/or defined by the media device. For example, in the flow 500 described above, a media device may sequentially identify segment boundaries as a media content item is received. However, a media device may also identify and upload segments non-sequentially. For example, a service provider system 204 may initially instruct a particular media device not to upload a particular segment because the same segment is currently being uploaded by one or more other media devices. However, the service provider system 204 may subsequently determine that the copies of the segment received from other media devices include one or more corruptions. In response, the service provider system 204 may request the particular media device to upload the segment at a later time. In this manner, the service provider system 204 may receive a complete and uncorrupted copy of a media content item even if the initially uploaded segments include one or more detected corruptions.

In one embodiment, a media device may be configured to identify and possibly upload one or more segments of a media content item in either an "active" or "passive" mode. In general, a media device may identify and upload segments in an active mode by processing the media content as the media content is received by the media device. For example, a media device receiving a live television feed may define segments and upload segments as directed by a service provider system 204 at the same time as the media device is receiving the television feed. As another example, a media device may define and upload segments in a passive mode where the media device defines and possibly uploads media content segments at a time after the media content is received. For example, a media device may receive and record a particular media content item in its entirety, and subsequently define segments.

In one embodiment, a service provider system 204 may instruct particular media devices to operate in an active or passive mode based on collected device performance data. For example, if a service provider system 204 determines that a particular media device has or is currently experiencing relatively slow network upload speeds, the system may instruct the media device to operate in a passive mode. Conversely, media devices that are determined to exhibit particularly strong network upload speeds may be instructed to operate in an active mode. In an embodiment, instead of receiving instructions from a service provider system, a media device may determine whether to operate in an active or passive mode based on device profile information stored at the media device. For example, a device profile may indicate whether a media device is to operate in an active or passive mode depending on detected current network or other operating conditions associated with the media device.

In the example process illustrated by FIG. 5, a media device generally determines whether to upload one or more segments based instructions received from a service provider system, the instructions based on segment identification values generated and sent by the media device to the service provider system. In other embodiments, media devices may determine whether to upload particular segments of a media content item based on one or more other processes that may or may not include interaction with the service provider system.

In one embodiment, a media device may determine whether or not to upload particular segments of a media content item without generating and/or sending segment identification values to a service provider system. For example, a media content management system may determine that one or more media devices of a population of media devices are each recording the same media content item and send instructions for uploading the media content item to each of the media devices. The instructions may assign to one or more of the media devices a portion of the media content item to upload. For example, one media device may receive instructions to upload the first ten segments, a second media device may receive separate instructions to upload the next ten segments, etc. In general, any division of segments amongst media devices of the population of media devices may be instructed. In this manner, each media device may receive the media content item, define segments of the media content item, and determine whether to upload one or more of the segments based on instructions received from the service provider system, and without sending segment identification values for each defined segment.

In an embodiment, a media device may determine whether or not to upload particular segments of a media content item based on segment identification values received from a media content management system. For example, a media content management system may generate the segment identification values for each media content item selected for recording by a media device of a population of media devices. The media content management system may send the segment identification values to the media device and the media device may use the values received from the media content management system to determine whether any segments of the copy of the media content item recorded by the media device differ from a version stored by the media content management system. The media device may then upload only those segments that differ from the copy at the media content management system. In another example, media devices may upload selected segments of media content items to a media content management system, and the system may generate segment identification values for the segments to determine whether or not to store or discard the uploaded segments.

In one embodiment, a population of media devices may upload a media content item scheduled for recording by the media content items by coordinating the upload amongst the devices and without receiving upload instructions from a centralized service provider system. For example, a media device that schedules a recording of a media content item may discover other media devices that have scheduled a recording of the same media content item (e.g., by the media devices periodically broadcasting recording schedules, obtaining recording schedules of other devices from a service provider system, etc.). The media devices may then communicate and determine which media devices are to upload which segments, for example, based on an equal upload sharing policy, based on measuring network statistics at each media device, or based on any other uploading policy determined amongst the media devices.

In one embodiment, a media device may individually determine whether to upload one or more segments without coordination with a media content management system or other media devices. In an embodiment, one or more of the upload management techniques described above may be used in combination. For example, each media device may individually determine one or more segments for potential upload. The one or more segments selected by each media device may be filtered out in collaboration with other media devices. For example, the media devices may determine a single media device to upload each segment that is selected by two or more media devices. Each of the media devices may then send a filtered list of segments to a media content management system, which may further filter the list of segments for each media device.

3.2. Cloud Storage of Media Content

As described above in reference to FIG. 5, each media device of a population of media devices may be configured to upload segments of media content items received by the media devices to a media content management system. In one embodiment, the media content management system may receive segment identification values from various media devices, determine based on the segment identification values whether to instruct particular media devices to upload the corresponding segments, and store uploaded segments and other metadata to track media content items recorded by particular media devices.

In one embodiment, metadata generated by a media content management system to track media content items recorded by particular media devices may include a "manifest" of uploaded segments. As used herein, a manifest generally refers to a file, database, or other data structure that includes information indicating, for each user account and media content item recorded by a media device associated with the user account, a list of the segments that comprise the media content item for that user account and media device. By maintaining a manifest of segments for particular user accounts and/or media devices, the media content management system enables users access to copies of media content items recorded by the user that are the same, or substantially the same, as the versions of the media content items originally received by the users' media devices, including individual variations that may result from local programming differences, interference or data corruption, etc. In an embodiment, the media content management system may assemble a media content item from a collection of segments for subsequent playback by using the manifest to identify particular segments and an ordering of the particular segments.

Figure 6:
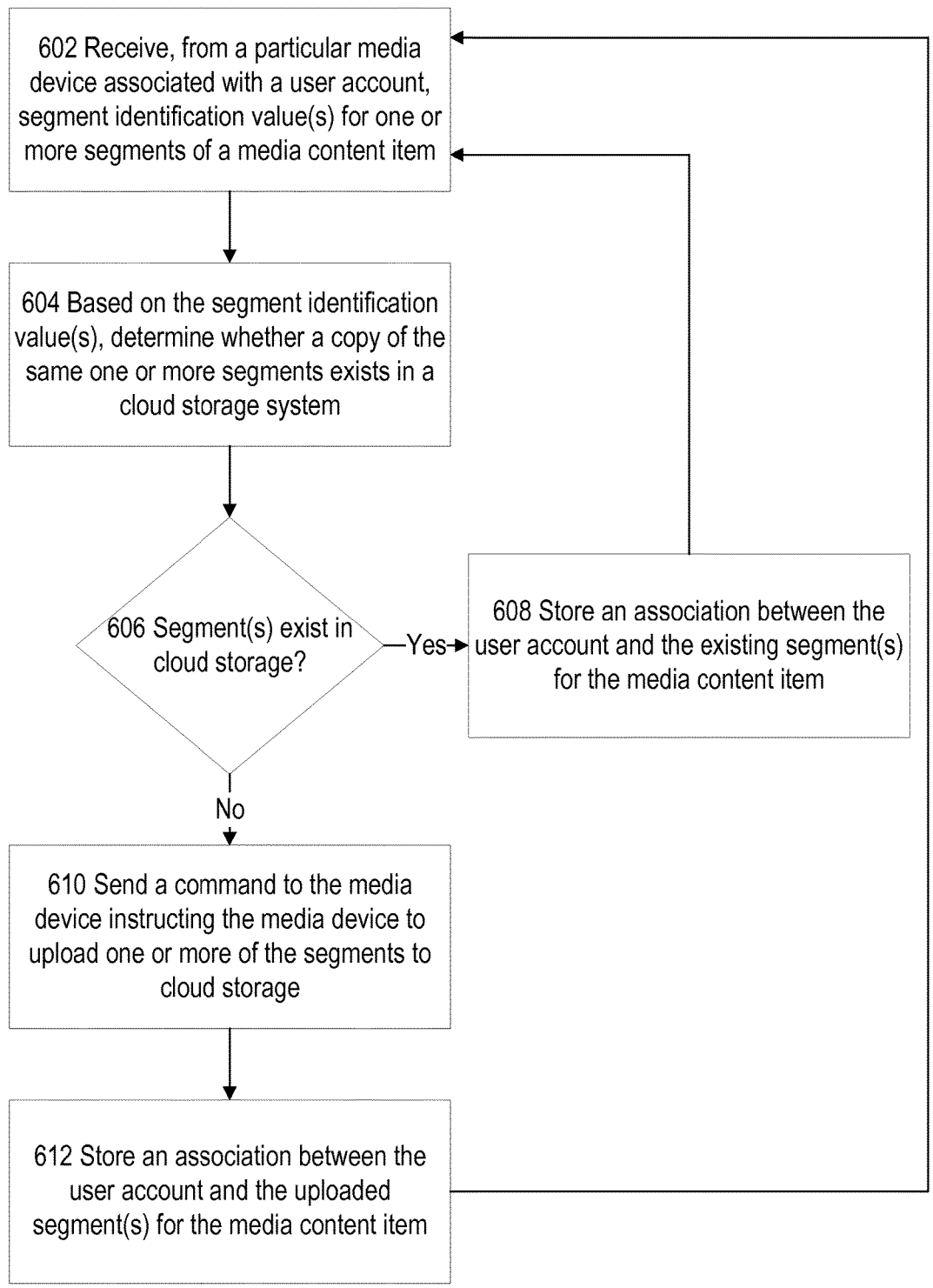
FIG. 6 depicts an example flow diagram for managing uploads of media content items from a population of media devices, in accordance with one or more embodiments.

FIG. 6 depicts an example flow diagram for managing uploads of media content items from a population of media devices. For example, the process illustrated by FIG. 6 may be implemented by a cloud-based media content management system to manage uploads of media content items from a population of media devices 108.

At block 602, the media content management system receives, from a particular media device associated with a user account, one or more segment identification values for one or more segments of a media content item. For example, the segment identification values may be generated by a media device 108 that is currently receiving, or has previously received, a media content item for viewing and/or recording, as described in reference to block 506 of FIG. 5. An identification of a user account associated with the media device may be included with the segment identification values, or the user account may be identified based on other information (e.g., a device and/or user account identifier sent with one or more other requests).

At block 604, the media content management system determines, based on the one or more segment identification values, whether a copy of the same one or more segments exists in a cloud storage system. For example, a cloud storage system may store, separately or in association with the corresponding media content segments, segment identifiers of media content segments currently stored by the cloud storage system or that are currently being uploaded to the cloud storage system by other media devices. Thus, a media content management system may determine whether a copy of the same segment is stored or is currently being received from another media device by comparing the one or more received segment identification values against segment identification values previously received from other media devices.

In one embodiment, a cloud-based management system may determine not only if a copy of the same segment currently exists in cloud-based storage, but if a sufficient number of copies of the segment are currently stored or are currently being uploaded. For example, a cloud-based media content management system may be configured to request two or more separate uploads of each media content segment from two or more separate media devices. The system may request separate uploads, for example, to improve the chance that a complete and error-free copy of each segment is received by the system. If the system receives two or more copies of a segment that are determined to be of the same quality, for example, the system may deduplicate storage of the segments by deleting one or more of the identical copies.

In one embodiment, determining if a copy of the same segment currently exists in cloud storage may include determining if a copy having the same, or substantially the same, quality currently exists in storage. For example, based on the segment identification values or other information received from a media device for a particular segment, an upload management module 306 may determine that while a similar copy of the same segment currently exists in cloud storage, one of the segments includes one or more data corruptions that cause the segments to differ. In this and other instances, the upload management module 306 of a service provider system 204 may or may not request a media device to upload a separate copy of the segment including the data corruptions. For example, based on content rights issues or other factors, an upload management module 306 may be configured to request an upload of two or more copies of the same segment if the two or more copies are sufficiently different from one another so that the copy of the segment stored for each of the respective media devices is sufficiently the same as the segment originally received.

In one embodiment, to determine whether to request separate uploads of a segment from different media devices, an upload management module 306 may assign a quality score to one or more segments identified by particular media devices. For example, a media device that receives and identifies a segment of a particular media content item that includes few or no detected data corruption/signal interference issues may receive a "good" score for that segment. On the other hand, if a media device received and identified the same segment with a significant number of detected data corruptions, the segment may receive a "bad" score. In one embodiment, the quality of a particular segment may be determined in various ways, including detecting a number of data corruptions (e.g., issues with PCR/PTS numbering, corrupted metadata, etc.), by comparing the sameness of various segment identification values, by comparing fingerprints generated for each segment, etc.

As indicated above, a comparison of the quality of two versions of a segment may determine how many copies of a particular segment a media content management system stores. For example, if the system determines that two versions of the same segment vary slightly, but are both of "good" quality, the system may store only one copy of the segment and use the copy interchangeably for requesting media devices. On the other hand, if the system determines that one media device recorded a particular segment of "good" quality, and a second media device recorded a "bad"

quality version of the same segment, the system may store a separate copy of each quality version. If a user associated with the first media device subsequently requests the media content item for playback, the user's device may receive the "good" quality version for that segment, while the second media device receives the "bad" quality version for the same segment. In other implementations, a media content management system may store and send to any device a copy of each segment that is of the best quality, regardless of the version of the media content item originally received by each user's media devices.

In one embodiment, a media content management system may determine whether a copy of the segment exists based on grouping media devices into two or more "zones." For example, a population of media devices may be grouped into a number of zones that correspond to various geographic areas or other grouping characteristics. A media content management system may be configured to generate a fingerprint from a segment received from each zone and compare the fingerprints to those derived from segments received from media devices in other zones. In this manner, portions of a media content item that are identical across the zones (e.g., the content of a television program) may be checked for upload and cloud storage from media devices in each zone less frequently, while portions of the media content item that differ across zones (e.g., regional commercials) may be uploaded from a device in each zone.

At block 606, if the media content management system determines that a sufficient number of copies of the one or more identified segments exist in cloud storage, then at block 608, the system sends a command to the media device instructing the media device not to upload the segment to cloud storage. At block 608, the media content management system stores, in a manifest that includes data for the user account associated with the media device, an association between the media content item and an existing copy of the segment. Thus, a copy of the media content item stored for the particular user account refers to the existing and common copy of the particular segment, and an additional copy of the same segment is not requested from the particular media device. Examples of storing a manifest of segments for particular media content items and for particular user accounts are described hereinafter in reference to FIG. 7A, FIG. 7B, and FIG. 8.

At block 606, if the media content management system determines that a sufficient number of copies of the segment do not currently exist in cloud storage, then at block 610 the system may send a command or other data to the media device instructing the media device to upload a copy of the segment to cloud storage. For example, the media content management system may not locate a copy of the segment corresponding to the received segment identification values because it is the first time a media device among a population of media devices has recorded that particular segment, or because there is some difference in the segment for the particular media device sending the request.

In an embodiment, multiple media devices may send one or more segment identification values for the same segment within a relatively small window of time. For example, if a new television program is airing and a large number of devices have each scheduled a recording of the program when it airs, each of the media devices may send the same segment identification values to the media content management system at approximately the same time when the program begins. Thus, a media content management system may select one or more media devices to upload a particular segment from among a number of possible media devices.

In one embodiment, when multiple media devices send segment identification values for the same media content segment at approximately the same time, a media content management system may simply select the one or more media devices from which the segment identification values are first received, or by randomly selecting one or more media devices to upload the segment. As another example, the media content management system may select one or more media devices to upload the segment based on factors related to the upload capabilities of each media device. For example, the upload capabilities may be determined based on one or more device information and/or performance measurements, including network capacity and other capabilities of each device (e.g., a type of the device, a type of network used by the device, measured upload speeds, current signal strength, bit errors, etc.) and/or historical data for each device (e.g., upload error rates, uploaded segment quality, etc.). A media device may, for example, periodically generate reception/performance measurements for the media device before and/or during a media content item recording and send the measurements to the media content management system to assist with a determination of devices to upload from. In one embodiment, a media content management system may designate, based on network capabilities and historical data, particular media devices as "preferred" uploaders and select those media devices for uploads when possible.

At block 612, in response to instructing a media device to upload a particular segment to cloud storage, the media content management system stores, for the user account associated with the media device, an association between the media content item and the uploaded segment. Similar to block 608, the media content management system may store the association between the media content item and the uploaded segment in a manifest that includes information for the user/media device account associated with the media device.

To illustrate some of the concepts described above, FIG. 7A, FIG. 7B, and FIG. 8 each illustrate various aspects of managing segments of a media content item uploaded from a population of media devices.

Figure 7A:
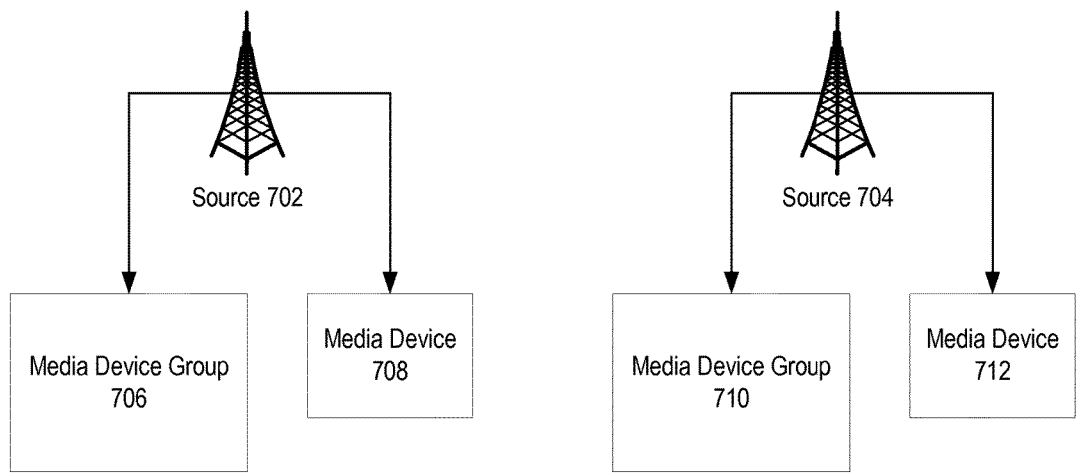
FIG. 7A depicts an example representation of a population of media devices receiving a media content item from multiple sources, in accordance with one or more embodiments.

FIG. 7A depicts an example representation of a population of media devices receiving a media content item from two different sources 702 and 704. In FIG. 7A, sources 702 and 704, for example, may each represent a separate television headend facility that is capable of receiving, processing, and distributing media content signals to a subset of a population of media devices. Each of sources 702 and 704 may, for example, be located in a different geographic area. Although each of sources 702 and 704 may distribute the same media content items (e.g., the same television programs, movies, etc.) to the population of media devices, differences may nevertheless exist in the media content items received by the media devices. For example, the differences may include differences in commercials or other local programming presented in specific geographic areas and interspersed in the media content items. As another example, differences may result from interference or corruption issues that are specific to a particular source and/or media device(s).

The example of FIG. 7A illustrates a scenario where four different versions of a same media content item are transmitted to a population of media devices. The first version of the media content item is transmitted to a media device group 706 which includes a plurality of media devices that may be associated with any number of separate user accounts. A second version of the media content item is transmitted to a single media device 708. A third version is transmitted to a media device group 710 that is different from media device group 706, and a fourth version is transmitted to a single media device 712 that is different from media device 708. As indicated above, four different versions of the same media content item may differ due to local programming differences (e.g., media device group 706 may receive different commercials from media device group 710) or isolated interference/corruption issues (e.g., major or minor corruptions in the data transmitted to media device 708 and media device 712).

Figure 7B:
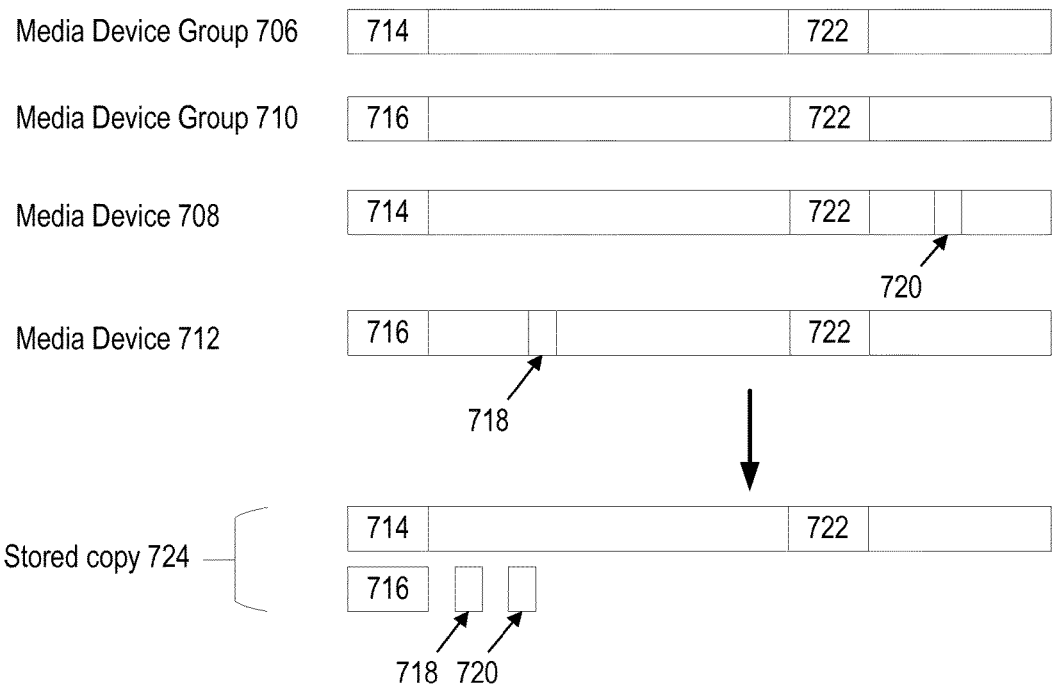
FIG. 7B depicts an example of a media content item uploaded by a population of media devices and storage of the media content item for the entire population, in accordance with one or more embodiments.

FIG. 7B depicts an example representation and resulting storage of the different versions of a media content item received by each of the media devices as depicted in FIG. 7A. In FIG. 7B, for example, each of the four different versions of the media content item is represented by a separate span of the media content item depicted to the right of the name of the media device(s) receiving that particular version. For example, each of the media devices of media device group 706 received a version of media content item beginning with a labeled portion 714, followed by an unlabeled portion, followed by a labeled portion 722, and followed by another unlabeled portion. Labeled portions 714 and 722, for example, may represent two separate portions of the media content item containing commercials, while the unlabeled portions represent portions of a television program airing in between the commercials.

Similarly, a media device 712 received a version of the media content item beginning with a portion 716, followed by an unlabeled portion, followed by a portion 718, followed by an unlabeled portion, followed by a portion 722, and followed by another unlabeled portion. Similar to media device group 706, portions 716 and 722 may represent commercials received by media device 712 and interspersed into a television program. Portion 718, for example, may represent one or more segments of the media content item where media device 712 received corrupted data that was not experienced by other devices. Similarly, portion 720, for example, may represent one or more segments of the media content item where media device 708 experienced a signal interference issue. In each instance, the corrupted data/signal interference may have displayed to the user as a small "glitch" or other defect in the media content and which may or may not have been easily perceived by the user viewing the video content.

Stored copy 724 illustrates an example representation of the data that may be stored by a media content management system for the media devices 706-712 receiving the media content item, as described above. In general, stored copy 724 illustrates an example of the deduplication of the four different versions of the media content item received by the media devices 706-712. For example, as illustrated by the top row of stored copy 724, a copy of portion 714 and portion 722 are stored along with the unlabeled portion in between those spans common to all of the media devices. In addition, portions 716, 718, and 720 are stored to account for differences seen by various media devices of the population. Each portion depicted in FIG. 7B may be comprised of one or more segments defined by the media devices. Thus, only one copy of common segments may be stored, while separate copies of differing segments for particular media devices are stored as well. In this manner, a substantially exact copy of a media content item as originally received by a media device may be stored, while still reducing the total amount of data stored for the media content item.

The stored copy 724 may further illustrate the result of segment deduplication performed by a service provider system 204. For example, multiple copies of portion 714 may initially have been received from media devices of media device group 706. After the multiple copies are received and initially stored, a service provider system 204 may determine that each of the multiple copies are identical and delete all of the copies except for one from storage. In this manner, the service provider system 204 may initially receive multiple copies of segments to better ensure that least one error free copy is received, but subsequently de-duplicate the extra copies to conserve space in cloud storage.

Figure 8:
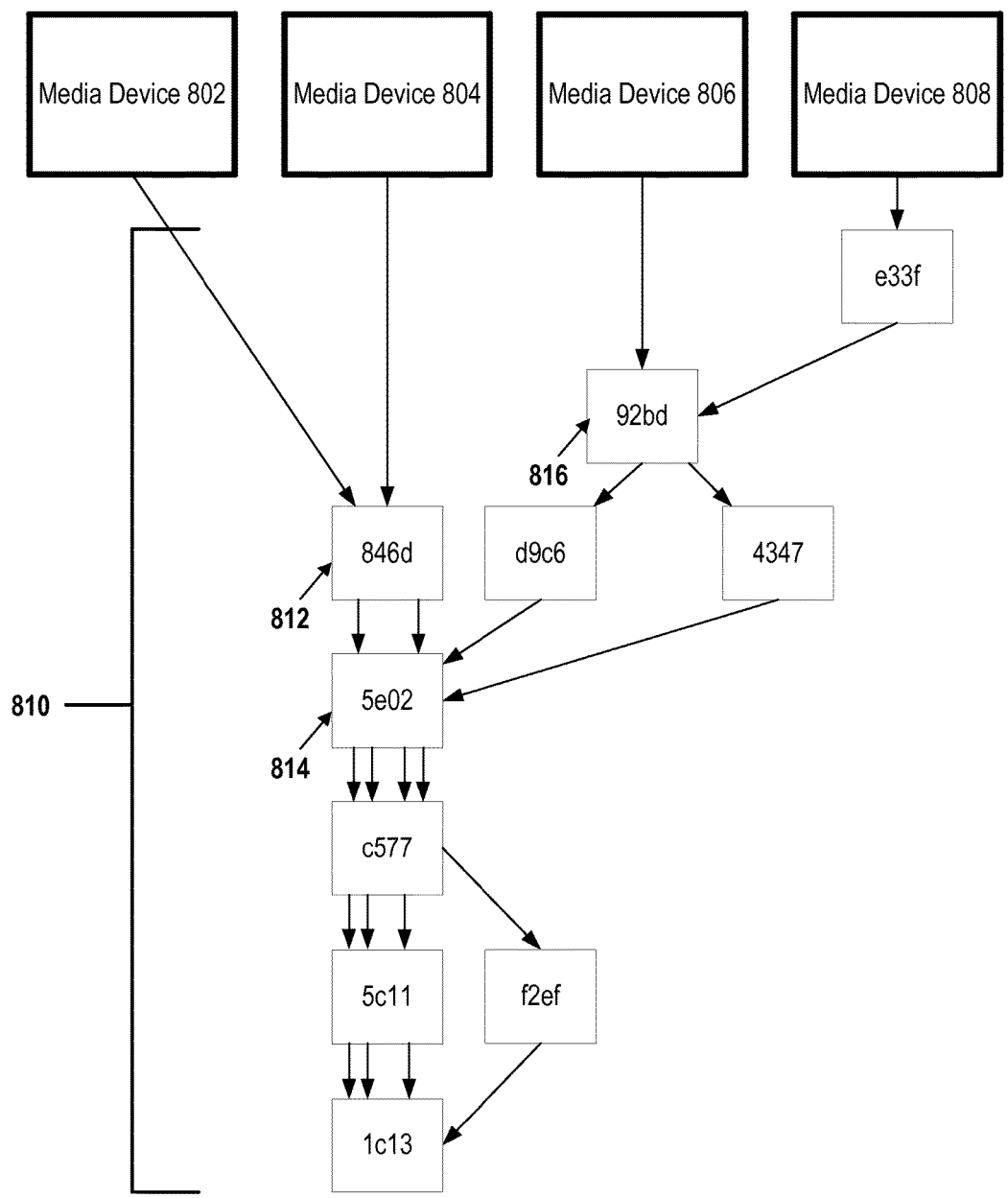
FIG. 8 depicts another example of a media content item uploaded by a population of media devices and storage of the media content item for the entire population, in accordance with one or more embodiments.

FIG. 7 depicts an example of how a media content management system can reduce an amount of storage space used to store different versions of a media content item received by a population of media devices. FIG. 8 depicts an example representation of how a collection of segments comprising a media content item, such as those depicted at the bottom of FIG. 7B, may be stored in order to enable a media content management system to reproduce a copy of a media content item for particular media devices. FIG. 8, for example, depicts a representation of segments stored for a particular media content item relative to four different media devices A-D. The example depicted in FIG. 8, for example, may be similar to the type of information stored for particular user accounts in a manifest, as described above in relation to FIG. 6.

In FIG. 8, for example, a media device 802 may have recorded a media content item 810, depicted as a collection 602 of linked segments. The first segment identified by media device 802 was segment 812, labeled with a segment identification value of "846d". The second segment identified by media device 802 was segment 814, labeled with a segment identification value of "5e02," and so forth. As another example, the first segment identified by a different media device 804 was also segment 812. Thus, because a media content management system determined that each of media device 802 and media device 804 reported recording the same segments 812 and 814 based on segment identification values received from the devices, the system may store only one copy of segments 812 and 814. The manifest for the user accounts associated with media device 802 and media device 804, respectively, each may include references or pointers to segments 812 and 814 as the first two segments of the media content item 810 for those user accounts. Furthermore, only one of media devices 802 and 804 (or possibly another media device not depicted) may have uploaded each of segments 812 and 814 to the cloud storage storing the segments.

As another example, media device 806 identified a different segment 816 as the first segment of the media content item 810. Media device 806 may have identified a different segment from media device 802 and media device 804, for example, because of local programming differences, broadcast timing differences, momentary interference, or any other issues that caused media device 806 to receive a different version of the first portion of the media content item. However, eventually media device 806 synced up with media device 802 and media device 804 and reported recording the same segment 814.

As illustrated by FIG. 8, for each media content item recorded by a media device, a possibly different series of segments may comprise the media content item for that media device, and for a user account associated with that media device. Segments that are identified by multiple media devices may be stored only once and referenced in the manifests for multiple user accounts associated with the media devices. In this manner, the amount of data stored by a media content management system is reduced, while retaining any individual differences encountered by particular media devices, thereby enabling the system to subsequently send a version of the media content item that is substantially the same as the version of the media content item originally recorded by each media device. Furthermore, copies of media content items stored locally at media devices may be deleted after recording to free up space, while those same media devices may continue to access the media content items from cloud-based storage.

3.3. Media Content Playback

Figure 9:
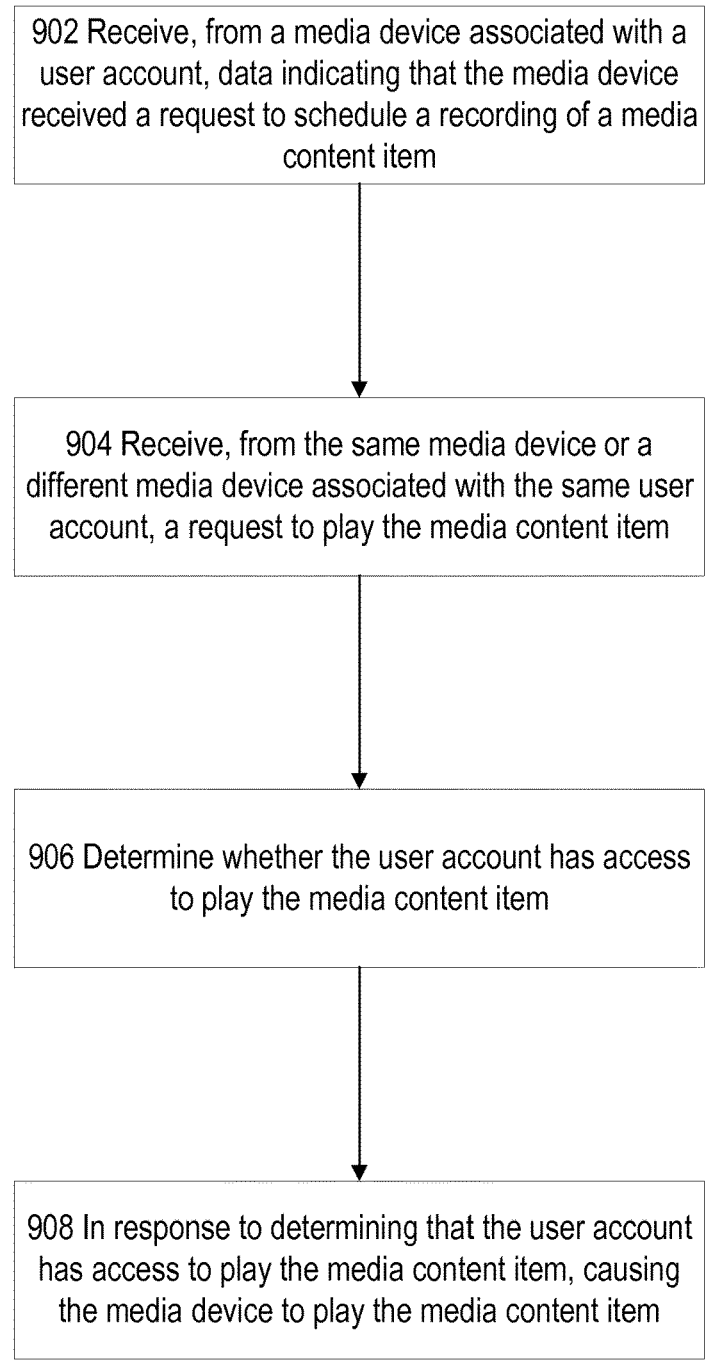
FIG. 9 depicts an example flow diagram for a cloud-based media content management system to manage access to media content items across multiple media devices associated with a user account, in accordance with one or more embodiments.

In one embodiment, a cloud-based media content management system enables users to schedule recordings of media content items at a first media device (e.g., a DVR, etc.) and to subsequently access the recorded media content item on other media devices (e.g., other DVRs, mobile devices, gaming devices, etc.). As described above, access to media content items across different media devices may be facilitated by cloud storage of media content items. In general, a cloud-based media content management system may manage access to media content items across media devices based on associated the recorded media content items with particular user accounts. FIG. 9 is a flow diagram illustrating an example process for a cloud-based media content management system to manage access to media content items across media devices.

At block 902, a server of a media content management system receives, from a media device associated with a user account, data indicating that the media device received a request to schedule a recording of a media content item. The media device may send the data, for example, in response to the media device receiving input at the media device or indirectly from another media device to schedule the recording.

In response to receiving the data indicating that the media device received a request to schedule a recording of the media content item, the media content management system may cause a copy of the media content item to be stored in a cloud storage system. In one embodiment, the system may cause a copy of the media content item to be stored in a cloud storage system by requesting a distributed upload of the media content item from a population of media devices, as described above in reference to FIGS. 5-8. As another example, the media content management system may directly obtain the media content item from a content source 106. For example, an operator headend 202 and/or cloud storage system 206 may directly receive and store a copy of the media content item from a content source 106.

At block 904, the server of the media content management system receives, from the same media device, or from a different media device associated with the same user account, a request to play the recorded media content item. For example, the user may later desire to view the recorded television program using a mobile device, possibly when the user has moved outside of the user's home. In response to user input at the mobile device requesting to view the media content item, the mobile device may send a request for the media content item to a cloud-based media content management system.

At block 906, in response to the request, it is determined whether the user account has access to play the media content item. In one embodiment, determining whether the user account has access to play the media content item may include determining whether the user previously requested a recording of the same media content item using one or more of the user's other media devices. In an embodiment, determining whether the user account has access to play the media content item may include determining whether the media content item is currently available for playing from a content source 106, such as a VOD library. In an embodiment, determining whether the user account has access to play the media content item may include determining whether the user previously scheduled a recording of the content item. For example, even if the user has subsequently deleted a recorded media content item, the media content item was deleted based on a deletion rule, or the media content item was not recorded due to a tuner conflict, the system may determine that the user has access to the media content item if the user previously selected the media content item for recording.

At block 908, in response to determining that the user account has access to play the media content item, the media content management system causes the user's media device to play the media content item. For example, the media content management system may cause the media device to play the media content item by causing a copy of the media content item to be streamed or downloaded from a cloud storage system to the media device. The media content management system may be configured to determine whether the user currently has a recorded copy of a media content item before allowing the user to access a copy of the media content item on another device, for example, in order to comply with applicable content rights related to distributing copies of media content items.

Figure 10:
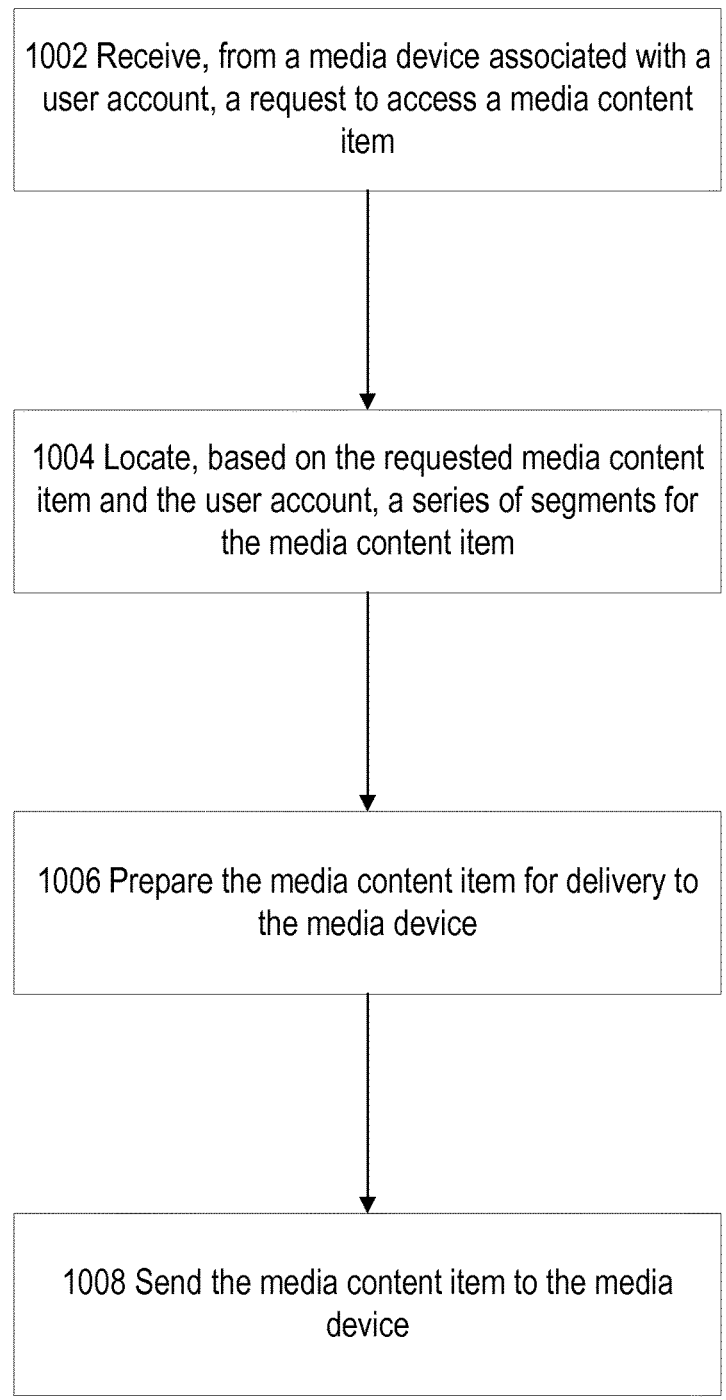
FIG. 10 depicts an example flow diagram for processing a request for a media content item stored by a cloud-based media content management system, in accordance with one or more embodiments.

In general, a cloud-based media content management system may send a media content item to a media device by streaming, downloading, or transmitting the media content in any other manner. If a media content item is uploaded to a cloud storage system as a collection of segments, one or more processing steps may be performed on the collection of segments before sending the media content item to media devices. FIG. 10 depicts an example flow 1000 for providing access to media content items uploaded from a distributed population of media devices, according to an embodiment.

At block 1002, a cloud-based media content management system receives, from a media devices associated with a user account, a request to access a media content item recorded by a user associated with the user account. For example, the user may select the media content item from an interface displayed at the media device and which lists media content items previously selected for recording by the user at the same media device, or at another media device associated with the same user account. The list of recorded media content items may be displayed to the user, for example, based on the user providing user account information (e.g., a username and password) at the media device.

At block 1004, the media content management system locates, based on the requested media content item and the user account, a series of segments for the media content item. As described in reference to FIG. 8, for example, a media content management system may store a manifest for each user account that indicates, for each media content item recorded by the user associated with the user account, a series of segments corresponding to the media content item. The information, for example, may include a series of segment identifiers that enable the system to locate each of the segments in one or more associated cloud storage systems.

At block 1006, the media content management system prepares the media content item for delivery to the requesting media device. In one embodiment, preparing the media content item for delivery may include "stitching" together a series of separately stored segments into a continuous stream of data. In general, stitching the segments together refers to combining some or all of separately stored segments into a continuous data stream that can be sent to the requesting media device. For example, stitching the segments together may refer to generating an MPEG content stream based on a plurality of separately stored segments. In another embodiment, the stored segments may be sent separately to the media device and stitched together by the requesting media device for display. As another example, preparing the media content item may include transcoding the segment data for delivery to specific types of media devices (e.g., a particular transcoding may be selected for particular types of mobile devices, gaming devices, etc.). The transcoding of the media content for particular types of media devices may include converting the media content to a different bitrate, converting the media content to a different encoding (e.g., single program transport stream (SPTS) into HTTP live streaming (HLS)), or performing any other transformations.

In one embodiment, preparing the media content item for delivery may include substituting one or more portions of the media item, overlaying information on the media content, or other modifications. For example, preparing the media content item may include determining one or more portions of the media content item corresponding to advertisements, and removing the advertisement portions or replacing the advertisements with alternative advertisements. As another example, preparing the media content item for delivery may include creating a condensed version of a media content item. For example, if the media content item corresponds to a sporting event, preparing the media content item for delivery may include assembling one or more "clips" based on the segments that may represent highlights or other portions of particular interest within the media content item. As yet another example, overlaying information on the media content may include adding textual information (e.g., actor names, ratings information, location names, closed captioning, etc.) on one or more frames of the media content.

At block 1008, the media content management system sends the media content item to the requesting media device. The media content management system may send the media content item by streaming or downloading the item to the device, by providing access to the media content item via a content delivery network (CDN), or by providing access to the media content from any other type of cloud storage system. For example, a streaming and hosting module 312 may stream the media content item directly to the requesting media device 108, or streaming and hosting module 312 may send a link or other reference enabling the media device 108 to access the media content item from a separate cloud storage system or other media content source.

The steps described above in reference to blocks 1002-1008 may occur concurrently with a media content management system receiving a media content item from a population of media devices. For example, as soon as the media content management system receives a first segment of a particular media content item, the system may begin preparing and sending the received segments to other requesting media devices, prior to an entire copy of the media content item being received.

In one embodiment, providing user access to a media content item may include providing access to a higher quality version of a media content item than the quality of the media content item originally recorded. For example, a user initially may schedule a recording of a media content item in standard-definition (SD) quality, despite the user also having access to a high-definition (HD) quality version of the same media content item on another channel. In this example, when the user requests access to the media content item from another device, the media content management system 102 may send an alert to the requesting media device indicating that the media content item is available for streaming in HD instead of SD as originally recorded. The ability for a media content management system to offer a user a higher quality version of a previously recorded media content item may depend on whether the user's account includes access to the HD version based on the user's content subscriptions.

In one embodiment, a media content management system providing access to a media content item may further include providing suggestions to the user for media content items related to the requested media content item. For example, if the user requests access to a particular television show previously recorded by the user, a media content management system may send information indicating other television shows that are similar to the requested television show, and which may originate from a different content source 106 than the requested television show. In an embodiment, a media content management system may provide an option to a user to automatically record suggested media content items on behalf of the user. For example, the system may provide an option for a user to automatically record media content items popular in the user's area, or based on other criteria, and record the recommended media content items for the user (which may include uploading one or more segments of the media content items from the user's media devices).

Figure 11:
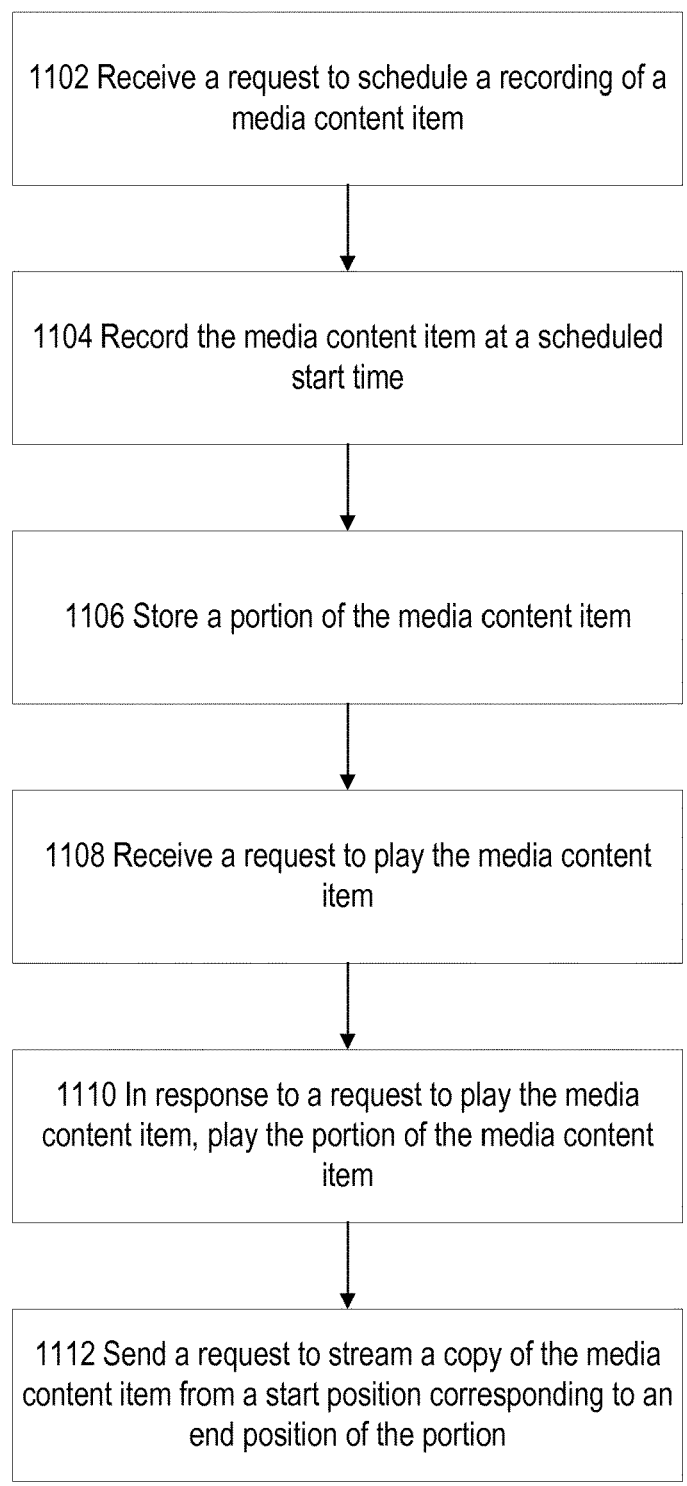
FIG. 11 depicts an example flow diagram for pre-caching portions of media content items at a media device for playback, in accordance with one or more embodiments.

In one embodiment, playback of media content items may include media devices pre-caching a portion of media content items. A pre-cached portion of a media content item generally refers to a relatively small portion of the media content item that may be used, for example, to efficiently play a media content item that is primarily stored in cloud storage. For example, if a user requests to play a media content item that is stored in cloud storage, a media device may initially play a locally stored portion of the media content item, avoiding any latency that may result from streaming the media content item from cloud storage. The remainder of the media content item may be streamed from the cloud storage. FIG. 11 depicts an example flow 1100 for providing access to media content items across media devices in a cloud-based media content management system, according to an embodiment.

At block 1102, a media device receives a request to schedule a recording of a media content item. For example, a media device 108 may receive the request to schedule a recording of the media content item as direct input from a user at the media device, as a command from a service provider system 204 (e.g., from a network scheduler 304), or as a command from any other device.

At block 1104, in response to the request to schedule the recording of the media content item, the media content item is recorded at the scheduled start time. For example, the media device may tune to the media content item at the scheduled start time and store a copy of the item at local storage of the media device. In an embodiment, the media device may further cause a service provider system 204 to store a copy of the media content item at a cloud storage system. For example, the media device may upload a copy of the media content item to the cloud storage system, the media content item may be uploaded as part of a distributed upload media device process, or a service provider system 204 may obtain a copy of the media content directly from a content source 106.

At block 1106, the media device stores a portion of the media content item. For example, the media device may initially store a copy of the entire media content item and subsequently delete all of the media content item except for the selected portion. As another example, the media device may initially store only the selected portion of the media content item, and cause the remainder of the media content item to be stored in a cloud storage system. The portion of the media content item generally may represent a leading portion of the media content item. For example, the portion may represent the first ten seconds of the media content, or any other duration of time at the beginning of the media content item. The size of the portion may be based on various factors, including the total duration of the media content item, the video and audio quality of the media content item, detected network conditions associated with the media device, an amount of available storage space at the media device, etc.

At block 1108, the media device receives a request to play the media content item. For example, the media device may receive the request to play the media content item as direct input from a user, or as input received from another device. The media content item may be selected, for example, from a list of recorded media content available to the user.

At block 1110, in response to the request to play the media content item, the media device plays the portion of the media content item. As indicated above, the portion of the media content item may represent a leading portion of the media content item. Thus, the media device may being playing of the portion in response to the request to the play the media content item, and without any delay that may be associated if the media content item were streamed from a remote, cloud storage system.

At block 1112, the media device sends, to a cloud storage system, a request to stream a copy of the media content item from a start position corresponding to an end position of the portion of the media content item. The media device may then, for example, continue playing the media content item when the end of the portion is reached by playing the streamed copy received from the cloud storage system. As described above, by initially playing a locally stored portion of a media content item stored in cloud storage, a media device may mitigate delays that may be associated with streaming the media content item from cloud storage when the media content item is selected for playback. In addition to reducing delays associated with playback of the media content item, the locally stored portion of the media content may enable a media device to more efficiently perform "trick play" functions, including fast forwarding, rewinding, pausing, etc., soon after the media content item is selected for playback.

3.4. Cloud-Based Tuners

A media device typically may include a fixed number of hardware tuners that are each capable of tuning to a media content stream (e.g., a live television feed) for playing, recording, etc., media content items. Each tuner typically may be able to tune to only a single media content stream at any given time, meaning the number of tuners present in a media device may limit a number of media content streams the media device can receive at the same time. For example, if a particular media device has two hardware tuners, then the media device may be capable of concurrently viewing and/or recording up to two media content streams. Thus, if a user of the example media device requests to record three content items that are airing at the same time, a tuner conflict exists and the user typically is forced to decide on only two of the three shows to record. This scenario may be extended to more than two tuners.

In one embodiment, when a media device 108 encounters a tuner conflict (e.g., due to a user requesting to record more media content streams than there are tuners available to the user), the media device 108 may send a request to a media content management system 102 to tune, record, and store the additional media content streams on behalf of the media device 108. In this manner, a user may not be limited to a number of physical tuners available to the user at the user's local media devices. The use of cloud tuners may, for example, be a service feature that a user pays an operator of a service provider system 204 a subscription or other fee to access.

Figure 12:
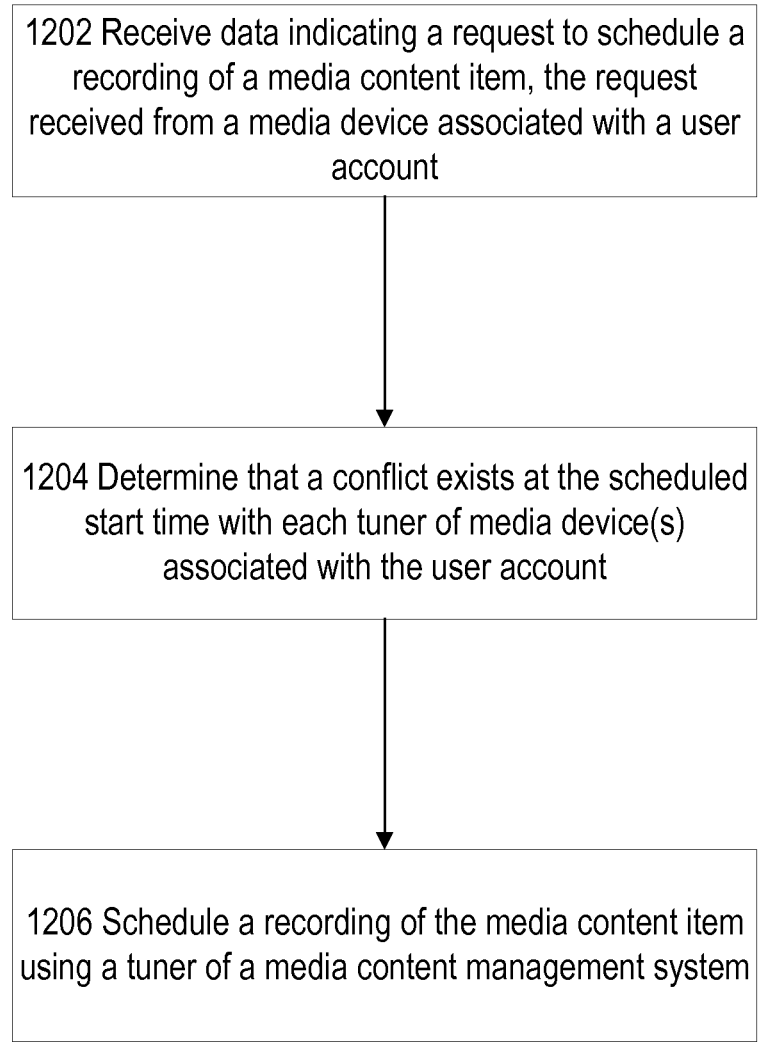
FIG. 12 depicts an example flow diagram for a cloud-based media content management system to manage tuner conflicts, in accordance with one or more embodiments.

FIG. 12 is a flow diagram of an example process for resolving tuner conflicts using tuners made available by a cloud-based media content management system. At block 1202, a server associated with one or more first tuners receives data indicating that a media device received a request to schedule a recording of a media content item. The media device may, for example, be one media device of a plurality of media devices associated with a particular user account. In an embodiment, the server may be part of service provider system 204 and configured to receive the data from media devices 108 when a media device receives a recording request from a user or other source. For example, a user may schedule a recording of a particular media content item at a local media device 108 and, in response to the request, the media device 108 may generate recording schedule information that is sent to service provider system 204. The recording schedule information may be stored in association with other user account information associated with the user.

In an embodiment, the one or more first tuners may be tuners managed by a service provider system 204, referred to herein as cloud tuners. In general, the tuners may be hosted by one or more computing devices managed by a service provider system 204, operator headend 202, and/or cloud storage system 206. The tuners may be configured to tune to and record content provided by one or more content sources 106.

At block 1204, a service provider system determines that a conflict exists at the scheduled start time of the recording with each tuner of the one or more media devices. For example, a service provider system 204 may store, for each user account, data indicating media devices associated with the user account and a number of tuners available at each media device. For example, one particular user account may be associated with three different devices (e.g., two different DVRs and a smartphone), each device having a possibly different number of available tuners.

In an embodiment, a service provider may determine whether a conflict exists by determining a number of media content items to be recorded at the scheduled start time, and further determining whether the number of media content items exceeds a number of tuners available at the user's media device. As described above, a service provider system 204 may store in association with each user account information about a number of tuners available to the user and also store recording schedule information for the user. Thus, the service provider system 204 may analyze the recording schedule information to determine a number of media content items to be recorded at particular times, and whether a sufficient number of tuners are available to the user to record all of the scheduled recordings. In one embodiment, if the service provider system 204 determines that an insufficient number of tuners are available to the user account, the system may send an alert message to the user. The alert message may, for example, present the user with the option to delete certain recordings to resolve the conflict, and may also present the user the option to use one or more cloud tuners to record one or more of the media content items and store the recordings in cloud storage.

At block 1206, in response to determining that a conflict exists, the service provider schedules a recording of the media content item to be recorded by a cloud tuner. For example, a service provider system 204 may instruct one or more tuners hosted at an operator headend 202, service provider system 204, and/or cloud storage system 206 to receive and store the additional media content items directly from a content source 106 and/or from other media devices 108 that have recorded or are scheduled to record the media content item. In an embodiment, media content items recorded and stored in cloud storage by a service provider system 204 may be associated with the user's account so that the user may later access the media content items using one or more of the user's media devices.

As indicated above, the recording of the media content item using a cloud tuner may be initiated in response to a user providing input indicating a desire to use the cloud tuner (e.g., in response to an alert message sent to the user's device), or the service provider system 204 may automatically initiate the recording without explicit user input. The service provider system 204 may then associate the recording with the user's account, enabling the user to access the recording at one or more of the user's media devices by streaming or downloading the content from cloud storage.

3.5. Cloud Storage Extender

The storage space available to a media device to store recorded media content items and other data is typically limited by an amount of storage provided by storage devices (e.g., one or more hard disks) integrated into the media device. Some media devices may include only a small amount of local storage and primarily function to stream media content to other devices rather than to store large numbers of media content items locally at the device. For these and other reasons, users commonly manage storage space available at media devices by manually deleting previously recorded media content items that are no longer of interest and/or configuring deletion policies that cause the media device to automatically delete recorded media content items after a configurable period of time (e.g., after 2 weeks). In one embodiment, a cloud-based media content management system may provide media devices with additional storage space for recorded media content items, and may enable media devices to access recorded media content items even after media content items are deleted from a media device (whether explicitly deleted by a user or deleted based on a deletion policy) at which the media content items originally were recorded.

Figure 13:
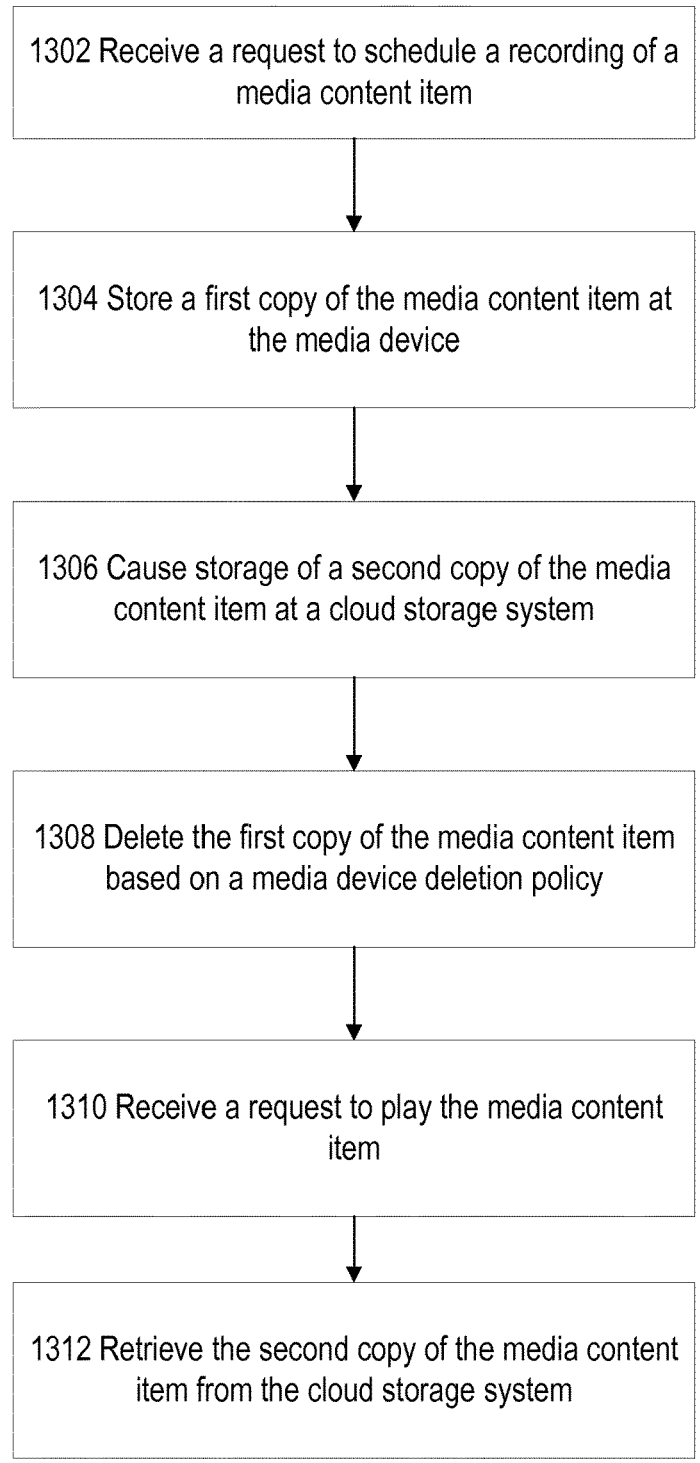
FIG. 13 depicts an example flow diagram for a cloud-based media content management system to manage storage of media content items, in accordance with one or more embodiments.

FIG. 13 is a flow diagram illustrating an example process for extending media device storage using a cloud storage system. At block 1302, a media device receives a request to schedule a recording of a media content item. For example, a media device 108 may receive the request to schedule the recording of a media content item as direct input from a user, or the request may be received from a service provider system 204, or from another device. At block 1304, the media device stores a first copy of the media content item at the media device.

At block 1306, the media device causes a second copy of the media content item to be stored at a cloud storage system. For example, a media device 108 may cause a second copy of the media content item to be stored at the cloud storage system by uploading an entire copy of the media content item, uploading one or more portions of the media content item as part of a distributed upload, causing a service provider system 204 to obtain the media content item from a content source.

At block 1308, based on a media device deletion policy, the first copy of the media content item stored at the media device may be deleted from storage at the media device. For example, a media device deletion policy may indicate that media content item is to be deleted based on a duration of storage of the media content item, based on determining that the media device is low on available storage space, etc. As another example, a media content item may be deleted explicitly by the user, possibly due to the user desiring to free storage space for other media content items.

At block 1310, subsequent to the first copy of the media content item being deleted from storage at the media device, a request to play the media content item is received. For example, when a user manually deletes a media content item or a media device deletes a media content item based on a deletion policy, a media content management system 102 may cause the deleted media content item(s) to be available to the user for an additional period of time after deletion. The "deletion" of a media content item may, for example, simply unlink the media content item from the user's account, instead of deleting the media content item from cloud storage. For example, in response to a user deleting a locally stored copy of a media content item from a media device 108, the media device may send a notification to the media content management system indicating that the user has requested deletion of the media content item. The media content management system may store or update data indicating that the user has requested deletion of the media content item (e.g., by removing a reference to the media content item from the user's account information), but continue to store a copy of the media content item in a cloud-based storage system for a configurable period of time after deletion (e.g., one week or one month). If the user later desires to view the previously deleted media content item within the allotted period of time, the user may access (e.g., stream or download) the media content item from cloud storage.

At block 1312, in response to receiving the request to play the media content item, the media device retrieves the second copy of the media content item from the cloud storage system. The media device may retrieve the second copy of the media content item from the cloud storage system by downloading or streaming a copy of the media content item. In an embodiment, the user may pay an additional subscription fee for the ability to retrieve previously deleted media content items, or the user may be charged an amount each time the user requests to access a previously deleted media content item.

In an embodiment, a cloud-based media content management system may be configured to store recorded media content items subject to one or more cloud storage deletion policies. As one example of a cloud storage deletion policy, a media content management system may store a media content item in cloud storage until the media content item is selected for deletion by each user account that originally selected the media content item for recording. As another example, a deletion policy may be based on a setting configured by a content provider and/or operator of an operator headend. In one embodiment, if conflicting deletion policies are specified by both of the content provider and a headend operator, then either the most restrictive or most liberal policy may be selected, depending on a particular implementation.

In an embodiment, users of a media content management system may be charged for storage space available to each user based on a number of different storage policies. As one example, each user account may be charged on a recurring basis based on the total amount of data stored by the user during each billing period. As another example, a user account may be charged based at least in part on a number of different devices to which a user is allowed to download and/or stream media content items stored in cloud storage. As yet other examples, a user account may be charged based on a number of concurrent streaming sessions a user is allowed, based on access to different bit rates and other media content quality attributes, or based on any other account conditions.

Figure 14:
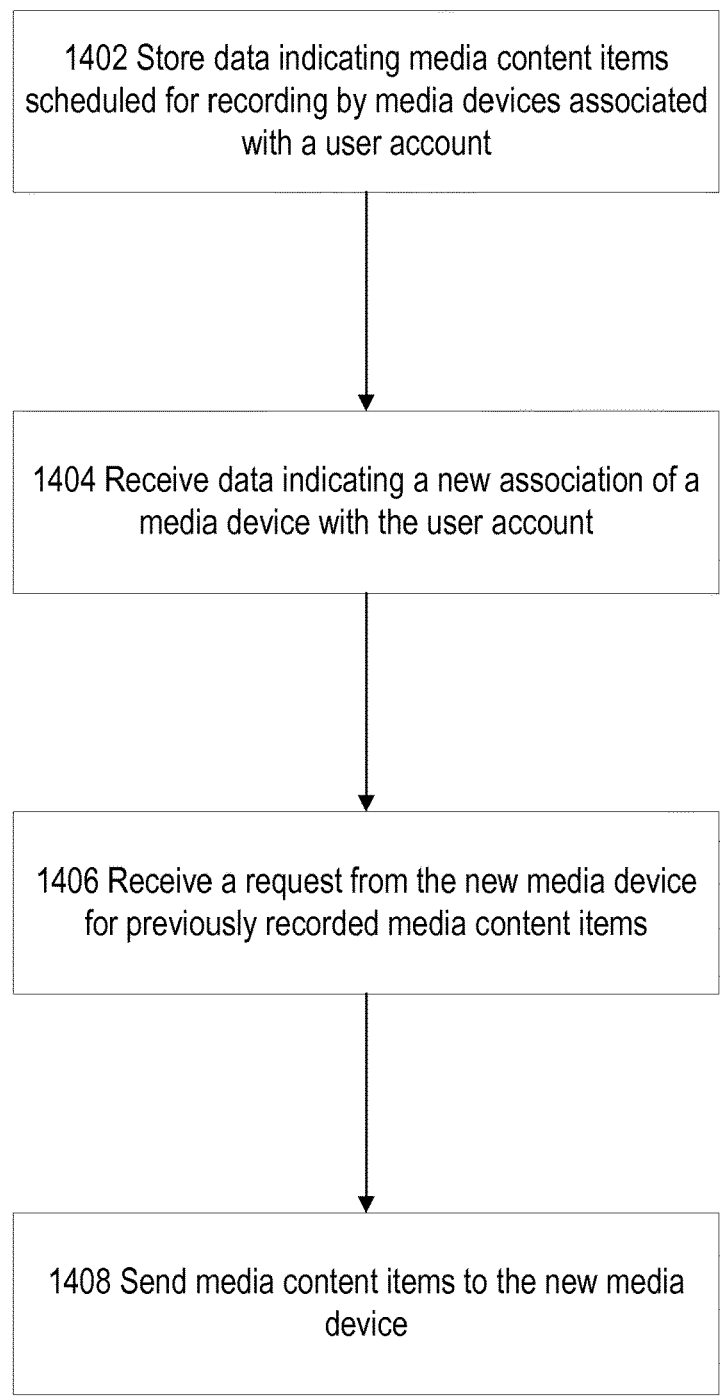
FIG. 14 depicts an example flow diagram for managing access to media content items for upgraded and/or replaced media devices, in accordance with one or more embodiments.

In one embodiment, storage of media content items in a cloud storage system may be used to enable users upgrading, replacing, or adding additional media devices to restore previously recorded media content items to the user's new media devices. FIG. 14 depicts an example flow 1400 for a cloud-based media content management system to manage access to media content items stored in cloud storage by upgraded and/or replaced media devices.

At block 1402, a cloud-based media content management system stores data indicating media content items scheduled for recording by one or more media devices associated with a user account. For example, each time a user selects a particular media content item for recording at a media device 108, the media device may send data to a service provider system 204 indicating information about the scheduled recording. In one embodiment, in response to receiving the data indicating information about the scheduled recording, a service provider system 204 may cause a copy of the media content item to be stored in cloud storage. For example, the service provider system 204 may cause the media content item to be uploaded from a population of media device 108, or the system may directly obtain the media content item from a content source 106.

At block 1404, the media content management system receives data indicating a new association of a media device with the user account. For example, a user associated with the user account may register the new device with a service provider system 204 by providing user credentials at the media device. In response to user providing the user credentials, the new media device may send data to the service provider system 204 identifying the media device and the user account. The service provider system 204 may then store information indicating that the new media device is associated with the user account. For example, the new media device may be a device that the user purchased to upgrade an existing device the user owns, to supplement the media devices already owned by the user, to replace a failed device, etc. In one embodiment, the service provider 204 may limit a number of devices that each user is allowed to associate with a user account, or an additional fee may be charged depending on a number of devices associated.

At block 1406, the system receives a request from the media device for media content items previously selected for recording by the same user account. For example, the request may be generated by the newly associated media device as part of an initial device configuration process, or in response to a user providing input requesting the device to retrieve one or more of the previously recorded media content items. If the user is replacing a failed media device with a replacement media device, for example, the user may desire to restore all of the media content items previously recorded by the failed media device and/or other media devices associated with the same user account.

At block 1408, the media content items are sent to the media device from cloud storage. For example, the service provider system 204 may send the media content items directly to the media device, or may otherwise cause the media device to access the media content items from a cloud storage system managed by the service provider system 204. The new media device may download and store the media content items to local storage and/or may stream the media content items for playback. In this manner, the service provider system 204 may enable users to upgrade and/or replace media devices without losing access to media content previously recorded by the user's other media devices.

4.0. Example Embodiments

In an embodiment, a method or non-transitory computer readable medium comprises: receiving, by a media device, a media content item; identifying boundaries of two or more segments within the media content item; based on identifying the boundaries of the two or more segments, selecting, by the media device, one or more particular segments of the two or more segments to send to a cloud storage system; sending the one or more particular segments to the cloud storage system.

In an embodiment, the method or non-transitory computer readable medium further comprises: generating one or more segment identification values for each of the two or more segments; sending the one or more segment identification values for each of the two or more segments to a media content management server.

In an embodiment, the method or non-transitory computer readable medium further comprises: generating one or more segment identification values for each of the two or more segments; sending a value derived from the one or more segment identification values for each of the two or more segments to a media content management server.

In an embodiment, the method or non-transitory computer readable medium further comprises: wherein selecting the one or more particular segments of the two or more segments to send to a cloud storage system includes receiving, from a media content management server, data instructing the media device to send the one or more particular segments to the cloud storage system.

In an embodiment, the method or non-transitory computer readable medium further comprises: wherein the boundaries of the two or more segments within the media content item are based on a specified number of group of pictures (GOPs) within the media content item.

In an embodiment, the method or non-transitory computer readable medium further comprises: wherein the boundaries of the two or more segments within the media content item are based on a specified range of metadata values associated with the media content item.

In an embodiment, the method or non-transitory computer readable medium further comprises: wherein the boundaries of the two or more segments within the media content item are based on a specified range of metadata values associated with the media content item, the metadata values representing program clock reference (PCR) values.

In an embodiment, the method or non-transitory computer readable medium further comprises: wherein the boundaries of the two or more segments within the media content item are based on a specified range of metadata values associated with the media content item, the metadata values representing presentation timestamp (PTS) values.

In an embodiment, the method or non-transitory computer readable medium further comprises: wherein generating the one or more segment identification values for each of the two or more segments includes generating a hash value based on data comprising the two or more segments.

In an embodiment, the method or non-transitory computer readable medium further comprises: wherein generating the one or more segment identification values for each of the two or more segments includes generating a fingerprint based on data comprising the two or more segments.

In an embodiment, the method or non-transitory computer readable medium further comprises: wherein the two or more segments represent two or more first segments; identifying boundaries of one or more second segments within the media content item, the one or more second segments representing a different portion of the media content item from the two or more first segments; generating one or more second segment identification values for each of the one or more second segments; sending the one or more second segment identification values for each of the one or more second segments to the media content management server; receiving data instructing the media device not to send the send one or more second segments to the cloud storage system.

In an embodiment, the method or non-transitory computer readable medium further comprises: determining one or more upload efficiency measurements associated with the media device, the upload efficiency measurements including one or more of: a signal strength of the media device, a type of network to which the media device is connected, a current network speed, a type of the media device; sending the upload efficiency measurements to the media content management server.

In an embodiment, the method or non-transitory computer readable medium further comprises: receiving, from a media content management server, data including instructions for identifying the boundaries of the two or more segments within the media content item.

In an embodiment, the method or non-transitory computer readable medium further comprises: receiving, from a second media device, data including instructions for identifying the boundaries of the two or more segments within the media content item.

In an embodiment, the method or non-transitory computer readable medium further comprises: receiving, by the media device, a second media content item; identifying boundaries of two or more segments within the second media content item; based on identifying the boundaries of the two or more segments within the second media content item, determining, by the media device, not to send any of the two or more segments within the second media content item to a cloud storage system.

In an embodiment, a method or non-transitory computer readable medium comprises: receiving, by a server associated with one or more first tuners, data indicating a request to schedule a recording of a media content item at a scheduled start time, the request received by a media device of one or more media devices associated with a user account; wherein the one or more media devices associated with the user account comprise one or more second tuners; determining that a conflict exists at the scheduled start time with each tuner of the one or second tuners; in response to determining that a conflict exists at the scheduled start time with each tuner of the one or more second tuners, scheduling a recording of the media content item using a tuner of the one or more first tuners.

In an embodiment, the method or non-transitory computer readable medium further comprises: wherein the recording of the media content item using the tuner of the one or more first tuners is stored in a cloud storage system.

In an embodiment, the method or non-transitory computer readable medium further comprises: sending a copy of the media content item to one or more of the media devices associated with the user account.

In an embodiment, the method or non-transitory computer readable medium further comprises: wherein the user account is charged a fee for use of the tuner of the one or more first tuners.

In an embodiment, a method or non-transitory computer readable medium comprises: receiving, at a media device, a request to schedule a recording of a media content item; based on the request to schedule the recording of the media content item, storing a first copy of the media content item at the media device; causing, at a cloud storage system, storage of a second copy of the media content item; based on a media device deletion policy, deleting the first copy of the media content item stored at the media device; subsequent to deleting the first copy of the media content item stored at the media device, receiving a request to play the media content item; in response to receiving the request to play the media content item, retrieving the second copy of the media content item from the cloud storage system.

In an embodiment, the method or non-transitory computer readable medium further comprises: wherein the cloud storage is managed by a cloud storage provider.

In an embodiment, the method or non-transitory computer readable medium further comprises: wherein the cloud storage is managed by a television headend operator.

In an embodiment, the method or non-transitory computer readable medium further comprises: based on a cloud storage deletion policy, removing the media content item from a list of media content items available to a user account associated with the media device.

In an embodiment, the method or non-transitory computer readable medium further comprises: based on a cloud storage deletion policy, removing the media content item from a list of media content items available to a user account associated with the media device; determining that a user associated with the user account purchased additional cloud storage space; based on determining that a user associated with the user account purchased additional cloud storage space, adding the media content item from the list of media content items available to the user account.

In an embodiment, a method or non-transitory computer readable medium comprises: receiving, at a media content management server, a first number of requests to schedule a recording of a particular media content item, each request of the first number of requests received from a media device of a plurality of media devices; wherein each media device of the plurality of media devices is associated with a user account of a plurality of user accounts, each user account of the plurality of user accounts associated with an amount of cloud storage space; causing storage of a second number of copies of the particular media content item at a cloud storage system accessible to the plurality of media devices via the Internet, the second number of stored copies less than the first number of requests to schedule a recording of the particular media content item; increasing an amount of used cloud storage space associated with each user account of the plurality of user accounts, the amount based on the size of the media content item.

In an embodiment, the method or non-transitory computer readable medium further comprises: wherein the amount represents the entire size of the media content item.

In an embodiment, the method or non-transitory computer readable medium further comprises: wherein the amount represents a fraction of the entire size of the media content item, the fraction based on the first number of requests.

In an embodiment, the method or non-transitory computer readable medium further comprises: receiving, from a particular media device of the plurality of media devices, a request to delete the media content item, the particular media device associated with a particular user account of the plurality of user accounts; decreasing the amount of used cloud storage space associated with the particular media content item.

In an embodiment, a method or non-transitory computer readable medium comprises: receiving, from a media device, a request to schedule a recording of a media content item; determining a relevancy value for the media content item, the relevancy value indicating a likelihood a request for playback of the media content item is received in a defined period of time; determining, based at least in part on the relevancy value, to store the media content item at one of a first storage system and a second storage system; storing the media content item at one of the first storage system and the second storage system.

In an embodiment, the method or non-transitory computer readable medium further comprises: determining, based at least in part on the relevancy value, a format for storing the media content item.

In an embodiment, the method or non-transitory computer readable medium further comprises: determining, based at least in part on the relevancy value, a quality level with which to store the media content item.

In an embodiment, the method or non-transitory computer readable medium further comprises: wherein the relevancy value is based on a population of user accounts.

In an embodiment, the method or non-transitory computer readable medium further comprises: wherein determining the relevancy value for the media content item includes analyzing historical data for one or more user accounts.

In an embodiment, the method or non-transitory computer readable medium further comprises: wherein the first storage system comprises cloud storage managed by a cloud storage provider, and wherein the second storage system comprises cloud storage managed by a television headend operator.

In an embodiment, a method or non-transitory computer readable medium comprises: storing, by a media content management server, data indicating a plurality of media content items scheduled for recording by one or more first media devices associated with a user account; receiving data indicating a new association of a second media device with the user account; receiving a request from the second media device for one or more media content items of the plurality of media content items; in response to determining that the second media device is associated with the user account, sending the one or more media content items to the second media device.

In an embodiment, a method or non-transitory computer readable medium comprises: storing, at a media device, a portion of a media content item; in response to receiving a request to play the media content item, the media device: playing the portion of the media content item; and sending, to a cloud storage system, a request to stream a copy of the media content item from a start position corresponding to an end position of the portion of the media content item.

In an embodiment, the method or non-transitory computer readable medium further comprises: receiving, at the media device, a request to schedule a recording of the media content item; in response to the request to schedule the recording of the media content item, recording the media content item at the scheduled start time; sending, to a media content management server, data indicating that the media device recorded the media content item; deleting, at the media device, all of the media content except for the portion of the media content item.

In an embodiment, the method or non-transitory computer readable medium further comprises: receiving, at the media device, a request to schedule a recording of the media content item; in response to the request to schedule the recording of the media content item, recording the media content item at the scheduled start time; sending, to a cloud storage system, a copy of the media content item.

In an embodiment, a method or non-transitory computer readable medium comprises: receiving, from a media device, data indicating that the media device received a command to pause playback of a live media content stream; in response to receiving the data indicating that the media device received the command to pause playback of the media content item, causing a server of a cloud storage system to record the media content item; in response to receiving data indicating that the media device received a command to resume playback of the media content item, streaming a copy of the media content item to the media device from the cloud storage system.

In an embodiment, the method or non-transitory computer readable medium further comprises: subsequent to receiving the data indicating that the media device received the command to pause playback of the media content item, receiving data indicating that the media device reached the live point of the media content item; in response to receiving the data indicating that the media device reached the live point of the media content item, ceasing streaming of the copy of the media content item from the cloud storage system; causing a television operator headend to resume sending the media content item to the media device.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    receiving, by a subset of media devices of a population of media devices, a request to record a media content item;
    in response to receiving the request to record the media content item, receiving, by each media device of the subset of media devices, a media content stream corresponding to the media content item;
    identifying, by each media device of the subset of media devices, boundaries of a plurality of segments within the media content stream;
    receiving, at a cloud storage system, performance measurements of each media device of the subset of media devices;
    selecting, by the cloud storage system, based on the performance measurements, a media device of the subset of media devices for upload of one or more particular segments of the plurality of identified segments to the cloud storage system;
    receiving, by the media device, from the cloud storage system, instructions to send the one or more particular segments of the plurality of identified segments to the cloud storage system;
    sending, by the media device, based on the instructions, the one or more particular segments to the cloud storage system while recording the media content item;
    receiving, at the cloud storage system, the one or more particular segments from the media device; and
    concurrently with receiving the one or more particular segments from the media device, sending, from the cloud storage system, at least a segment of the one or more particular segments received from the media device to media devices of the population of media devices other than the media device.

2. The method of claim 1, further comprising:
    generating one or more segment identification values for each segment of the plurality of segments;
    sending, to the cloud storage system, the one or more segment identification values.

3. The method of claim 1, further comprising:
    generating one or more segment identification values for each of the plurality of segments;
    sending, to the cloud storage system, one or more values derived from the one or more segment identification values for each of the plurality of segments.

4. The method of claim 2, wherein generating the one or more segment identification values for each segment of the plurality of segments includes generating a hash value based on data from the segment.

5. The method of claim 2, wherein generating the one or more segment identification values for each segment of the plurality of segments includes generating a fingerprint based on data from the segment.

6. The method of claim 2, wherein the one or more particular segments are one or more first particular segments, and wherein the instructions further include instructions not to send one or more second particular segments of the plurality of identified segments to the cloud storage system.

7. The method of claim 1, further comprising:
    determining, by each media device of the subset of media devices, one or more performance measurements associated with the respective media device, the performance measurements including one or more of:
        a signal strength of the media device, a type of network to which the media device is connected, a current network speed, at type of media device; and
    sending, by each media device of the subset of media devices, the performance measurements to the cloud storage system.

8. The method of claim 1, further comprising receiving, at a media device of the subset of media devices, from the cloud storage system, data including instructions for identifying the boundaries of each segment of the plurality of segments within the media content stream.

9. The method of claim 1, further comprising the media device receiving, at a media device of the subset of media devices, from a second media device of the subset of media devices, data including instructions for identifying the boundaries of each segment of the plurality of segments within the media content stream.

10. The method of claim 1, further comprising:
receiving, by the media device, a second media content stream;
identifying boundaries of a plurality of segments within the second media content stream; receiving, by the media device, instructions not to send any of the plurality of segments within the second media content stream to a cloud storage system.

11. One or more non-transitory computer-readable storage media, storing instructions, which when executed by one or more processors cause performance of:
receiving, by a subset of media devices of a population of media devices, a request to record a media content item;
in response to receiving the request to record the media content item, receiving, by each media device of the subset of media devices, a media content stream corresponding to the media content item;
identifying, by each media device, boundaries of a plurality of segments within the media content stream;
receiving, at a cloud storage system, performance measurements of each media device of the subset of media devices;
selecting, by the cloud storage system, based on the performance measurements, a media device of the subset of media devices for upload of one or more particular segments of the plurality of identified segments to the cloud storage system;
receiving, by the media device, from the cloud storage system, instructions to send the one or more particular segments of the plurality of identified segments to the cloud storage system;
sending, by the media device, based on the instructions, the one or more particular segments to the cloud storage system while recording the media content item;
receiving, at the cloud storage system, the one or more particular segments from the media device; and
concurrently with receiving the one or more particular segments from the media device, sending, from the cloud storage system, at least a segment of the one or more particular segments received from the media device to media devices of the population of media devices other than the media device.

12. The one or more non-transitory storage media of claim 11, further comprising:
generating one or more segment identification values for each segment of the plurality of segments;
sending, to the cloud storage system, the one or more segment identification values for each of the two or more segments.

13. The one or more non-transitory storage media of claim 11, further comprising:
generating one or more segment identification values for each of the plurality of segments;
sending, to the cloud storage system, one or more values derived from the one or more segment identification values for each of the plurality of segments.

14. The one or more non-transitory storage media of claim 12, wherein generating the one or more segment identification values for each segment of the plurality of segments includes generating a hash value based on data from the segment.

15. The one or more non-transitory storage media of claim 12, wherein the one or more particular segments are one or more first particular segments, and wherein the instructions further include instructions not to send one or more second particular segments of the plurality of identified segments to the cloud storage system.

16. The one or more non-transitory storage media of claim 11, further comprising receiving, from the cloud storage system, data including instructions for identifying the boundaries of each segment of the plurality of segments within the media content stream.

17. A system, comprising:
a media device of a population of media devices, the media device comprising:
one or more first processors;
one or more first computer-readable storage media storing instructions which, when executed by the one or more first processors, causes the media device to:
receive a request to record a media content item;
in response to receiving the request to record the media content item, receive a media content stream corresponding to the media content item;
identify boundaries of a plurality of segments within the media content stream;
send performance measurements of the media device to a cloud storage system;
receive instructions to send one or more particular segments of the plurality of identified segments to the cloud storage system;
send, based on the instructions, the one or more particular segments to the cloud storage system while recording the media content item; and
the cloud storage system comprising:
one or more second processors;
one or more second computer-readable storage media storing instructions which, when executed by the one or more second processors causes the cloud storage system to:
receive, from each media device of the population of media devices, performance measurements of each respective media device;
select the media device, based on the performance measurements of the media device, for upload of the one or more particular segments;
receive the one or more particular segments from the media device; and
concurrently with receiving the one or more particular segments from the media device, send at least a segment of the one or more particular segments received from the media device to media devices of the population of media devices other than the media device.

18. The system of claim 17, wherein execution of the instructions by the one or more first processors further causes the media device to:
generate one or more segment identification values for each segment of the plurality of segments;
wherein the media device sends the one or more segment identification values to the cloud storage system.

19. The system of claim 17, wherein execution of the instructions by the one or more first processors further causes the media device to:
generate one or more segment identification values for each segment of the plurality of segments;
send, to the cloud storage system, one or more values derived from the one or more segment identification values for each of the plurality of segments.

20. The system of claim 18, wherein generating the one or more segment identification values for each segment of the plurality of segments includes generating a hash value based on data from the segment.

21. The system of claim 18, wherein the one or more particular segments are one or more first particular segments, and wherein the instructions further include instructions not to send one or more second particular segments of the plurality of identified segments to the cloud storage system.

22. The method of claim 1, further comprising in response to receiving the request to record the media content item, tuning to the media content item.

23. The one or more non-transitory computer-readable storage media of claim 11, further comprising in response to receiving the request to record the media content item, tuning to the media content item.

24. The system of claim 17, wherein execution of the instructions by the one or more first processors further causes the media device to, in response to receiving the request to record to the media content item, tuning to the media content item.

25. The method of claim 1, wherein:
in response to receiving the one or more particular segments from the media device, the cloud storage system stores metadata to track media content items recorded by the media device, and wherein sending at least a segment of the one or more particular segments received from the media device further comprises sending at least a segment of the one or more particular segments having metadata indicating that the media content item was recorded by the media device.

26. The one or more non-transitory computer-readable storage media of claim 11, wherein:
in response to receiving the one or more particular segments from the media device, the cloud storage system stores metadata to track media content items recorded by the media device, and wherein sending at least a segment of the one or more particular segments received from the media device further comprises sending at least a segment of the one or more particular segments having metadata indicating that the media content item was recorded by the media device.

27. The system of claim 17, wherein:
in response to receiving the one or more particular segments from the media device, the cloud storage system stores metadata to track media content items recorded by the media device, and wherein sending at least a segment of the one or more particular segments received from the media device further comprises sending at least a segment of the one or more particular segments having metadata indicating that the media content item was recorded by the media device.

28. The one or more non-transitory computer-readable storage media of claim 11, further comprising:
determining, by each media device of the subset of media devices, one or more performance measurements associated with the respective media device, the performance measurements including one or more of:
a signal strength of the media device, a type of network to which the media device is connected, a current network speed, at type of media device; and
sending, by each media device of the subset of media devices, the performance measurements to the cloud storage system.

29. The system of claim 17, wherein execution of the instructions by the one or more first processors further causes the media device to:
determine one or more-performance measurements associated with the media device, the performance measurements including one or more of:
a signal strength of the media device, a type of network to which the media device is connected, a current network speed, at type of media device; and
send the performance measurements to the cloud storage system.

30. A method, comprising:
receiving, from a plurality of media devices, performance measurements of each respective media device, wherein each media device receives and records a media content stream corresponding to a first media content item in response to a request to record the first media content item, and wherein each media device identifies boundaries of a plurality of segments within the media content stream;
selecting, based on the performance measurements, a media device of the plurality of media devices for upload of one or more particular segments of the plurality of identified segments;
transmitting instructions to the selected media device to send the one or more particular segments of the plurality of identified segments;
receiving, from the selected media device, the one or more particular segments; and
concurrently with receiving the one or more particular segments from the selected media device, sending a segment of the one or more particular segments received from the selected media device to media devices of the plurality of media devices other than the selected media device.

31. The method of claim 30, further comprising:
receiving one or more segment identification values from each media device of the plurality of media devices.

32. The method of claim 30, further comprising:
receiving one or more values derived from one or more segment identification values from each media device of the plurality of media devices.

33. The method of claim 31, wherein the segment identification values include a hash value based on data from the segment.

34. The method of claim 31, wherein the segment identification values include a fingerprint based on data from the segment.

35. The method of claim 31, further comprising:
transmitting second instructions to the selected media device not to send one or more second particular segments of the plurality of identified segments.

36. The method of claim 30, further comprising:
in response to receiving the one or more particular segments from the selected media device, storing metadata to track media content items recorded by the selected media device; and
wherein sending a segment of the one or more particular segments received from the selected media device further comprises sending a segment of the one or more particular segments having metadata indicating that the media content item was recorded by the selected media device.

37. One or more non-transitory computer-readable storage media, storing instructions, which when executed by one or more processors cause performance of:

receiving, from a plurality of media devices, performance measurements of each respective media device, wherein each media device receives and records a media content stream corresponding to a first media content item in response to a request to record the first media content item, and wherein each media device identifies boundaries of a plurality of segments within the media content stream;

selecting, based on the performance measurements, a media device of the plurality of media devices for upload of one or more particular segments of the plurality of identified segments;

transmitting instructions to the selected media device to send the one or more particular segments of the plurality of identified segments;

receiving, from the selected media device, the one or more particular segments; and concurrently with receiving the one or more particular segments from the selected media device, sending a segment of the one or more particular segments received from the selected media device to media devices of the plurality of media devices other than the selected media device.

38. The one or more non-transitory computer-readable storage media of claim 37, wherein execution of the instructions further causes performance of:

receiving one or more segment identification values from each media device of the plurality of media devices.

39. The one or more non-transitory computer-readable storage media of claim 37, wherein execution of the instructions further causes performance of:

receiving one or more values derived from one or more segment identification values from each media device of the plurality of media devices.

40. The one or more non-transitory computer-readable storage media of claim 38, wherein the segment identification values include a hash value based on data from the segment.

41. The one or more non-transitory computer-readable storage media of claim 38, wherein the segment identification values include a fingerprint based on data from the segment.

42. The one or more non-transitory computer-readable storage media of claim 38, wherein execution of the instructions further causes performance of:

transmitting second instructions to the selected media device not to send one or more second particular segments of the plurality of identified segments.

43. The one or more non-transitory computer-readable storage media of claim 37, wherein execution of the instructions further causes performance of:

in response to receiving the one or more particular segments from the selected media device, storing metadata to track media content items recorded by the selected media device; and wherein performance of sending a segment of the one or more particular segments received from the selected media device further causes performance of sending a segment of the one or more particular segments having metadata indicating that the media content item was recorded by the selected media device.

44. A cloud storage system, comprising:

one or more processors; and one or more computer-readable storage media storing instructions which, when executed by the one or more processors, causes the cloud storage system to:

receive, from a plurality of media devices, performance measurements of each respective media device, wherein each media device receives and records a media content stream corresponding to a first media content item in response to a request to record the first media content item, and wherein each media device identifies boundaries of a plurality of segments within the media content stream;

select, based on the performance measurements, a media device of the plurality of media devices for upload of one or more particular segments of the plurality of identified segments;

transmit instructions to the selected media device to send the one or more particular segments of the plurality of identified segments;

receive, from the selected media device, the one or more particular segments; and concurrently with receiving the one or more particular segments from the selected media device, send a segment of the one or more particular segments received from the selected media device to media devices of the plurality of media devices other than the selected media device.

45. The system of claim 44, wherein execution of the instructions further causes the cloud storage system to:

receive one or more segment identification values from each media device of the plurality of media devices.

46. The system of claim 44, wherein execution of the instructions further causes the cloud storage system to:

receive one or more values derived from one or more segments identification values from each media device of the plurality of media devices.

47. The system of claim 45, wherein the segment identification values include a hash value based on data from the segment.

48. The system of claim 45, wherein the segment identification values include a fingerprint based on data from the segment.

49. The system of claim 45, wherein execution of the instructions further causes the cloud storage system to:

transmit second instructions to the selected media device not to send one or more second particular segments of the plurality of identified segments.

50. The system of claim 44, wherein execution of the instructions further causes the cloud storage system to:

in response to receiving the one or more particular segments from the selected media device, store metadata to track media content items recorded by the selected media device; and wherein execution to the instructions to send a segment of the one or more particular segments received from the selected media device further causes the cloud storage system to send a segment of the one or more particular segments having metadata indicating that the media content item was recorded by the selected media device.

* * * * *